(12) United States Patent  (10) Patent No.: US 8,247,010 B2
Nguyen et al.  (45) Date of Patent: Aug. 21, 2012

(54) ACCELERATED LOW PRESSURE BREWER AND A METHOD FOR MAKING A BEVERAGE

(75) Inventors: Quan Hoang Nguyen, Renton, WA (US); Christopher Dalton Collier, Monroe, WA (US); James Michael McLaughlin, Seattle, WA (US)

(73) Assignee: Concordia Coffee Company, Inc., Bellevue, WA (US)

( * ) Notice: Subject to any disclaimer, the term of this patent is extended or adjusted under 35 U.S.C. 154(b) by 59 days.

(21) Appl. No.: 13/038,195

(22) Filed: Mar. 1, 2011

(65) Prior Publication Data
US 2011/0212236 A1 Sep. 1, 2011

Related U.S. Application Data

(60) Provisional application No. 61/309,401, filed on Mar. 1, 2010.

(51) Int. Cl.
*A47J 31/42* (2006.01)
(52) U.S. Cl. .............. 426/433; 99/275; 99/280; 99/287; 99/290
(58) Field of Classification Search .................. 426/433; 99/280, 287, 290, 275
See application file for complete search history.

(56) References Cited

U.S. PATENT DOCUMENTS

| | | | |
|---|---|---|---|
| 332,199 A | 12/1885 | Henderson | |
| 2,658,645 A | 11/1953 | Harris | |
| 2,733,731 A | 2/1956 | Turak | |
| 3,249,196 A | 5/1966 | Maxwell | |
| 3,369,478 A * | 2/1968 | Black | 99/289 R |
| 3,385,569 A | 5/1968 | Bookout | |
| 3,671,273 A | 6/1972 | Gunter | |
| 4,211,342 A | 7/1980 | Jamgochian | |
| 4,271,752 A * | 6/1981 | Valente et al. | 99/289 R |
| 4,308,789 A * | 1/1982 | Piloni et al. | 99/289 R |
| 4,649,809 A | 3/1987 | Kanezashi | |

(Continued)

FOREIGN PATENT DOCUMENTS

CA  2 627 328 A1  3/2007
(Continued)

OTHER PUBLICATIONS

International Search Report and Written Opinion mailed Dec. 13, 2011, issued in corresponding International Application No. PCT/US2011/032361, filed Apr. 13, 2011, 8 pages.

(Continued)

*Primary Examiner* — Anthony Weier
(74) *Attorney, Agent, or Firm* — Christensen O'Connor Johnson Kindness PLLC

(57) ABSTRACT

A brewing system (100) includes a brew group (130) having a cylindrical brewing chamber (132), a first actuator (146) attached to an upper piston assembly (140) that is movable to sealingly engage one end of the brewing chamber, a second actuator (156) attached to a lower piston assembly (150) that slidably engages the opposite end of the brewing chamber. The lower piston assembly includes a water supply tube (151) that engages a channel through the piston to supply heated water to the brewing chamber. The upper piston assembly includes a dispensing tube (141) that engages a channel through the piston to accommodate dispensing the brewed liquid. A sliding arm assembly is positioned to remove spent grounds from the brewing assembly. The current embodiment includes a controller (100), hopper (112), water heater (11) and grinder assembly (120). An optional flavoring dispenser may also be provided.

24 Claims, 22 Drawing Sheets

U.S. PATENT DOCUMENTS

| | | | |
|---|---|---|---|
| D289,129 | S | 4/1987 | Syverson |
| 4,715,274 | A | 12/1987 | Paoletti |
| 4,797,296 | A | 1/1989 | Meier |
| 4,815,633 | A | 3/1989 | Kondo |
| 4,873,916 | A | 10/1989 | Piscaer |
| D313,724 | S | 1/1991 | Piñon |
| D316,794 | S | 5/1991 | Volgger |
| 5,033,645 | A | 7/1991 | Shannon |
| D318,973 | S | 8/1991 | Hasslacher |
| 5,116,632 | A | 5/1992 | Miller |
| 5,207,148 | A | 5/1993 | Anderson |
| D337,475 | S | 7/1993 | Seiffert |
| 5,230,277 | A | 7/1993 | Bianco |
| 5,233,915 | A | 8/1993 | Siccardi |
| D340,611 | S | 10/1993 | Hoover |
| 5,303,639 | A | 4/1994 | Bunn |
| 5,309,822 | A | 5/1994 | Sager |
| 5,316,781 | A | 5/1994 | Lüssi |
| 5,333,537 | A * | 8/1994 | Lussi et al. ............ 99/287 |
| 5,344,050 | A | 9/1994 | Ficken |
| 5,353,692 | A | 10/1994 | Reese |
| 5,393,540 | A | 2/1995 | Bunn |
| 5,423,245 | A | 6/1995 | Midden |
| D365,490 | S | 12/1995 | Pomeroy |
| 5,579,678 | A | 12/1996 | Goerndt |
| 5,650,186 | A | 7/1997 | Annoni |
| 5,657,683 | A * | 8/1997 | Sandei et al. ............ 99/287 |
| 5,733,591 | A | 3/1998 | Goerndt |
| D395,975 | S | 7/1998 | Munoz |
| D396,987 | S | 8/1998 | Seiffert |
| 5,911,810 | A | 6/1999 | Kawabata |
| 5,941,163 | A | 8/1999 | Park |
| D413,757 | S | 9/1999 | Muñoz |
| D414,371 | S | 9/1999 | Seiffert |
| D417,118 | S | 11/1999 | Pomeroy |
| 6,019,032 | A | 2/2000 | Arksey |
| 6,098,524 | A | 8/2000 | Reese |
| 6,099,878 | A | 8/2000 | Arksey |
| 6,135,169 | A | 10/2000 | Sandei |
| 6,182,555 | B1 | 2/2001 | Scheer |
| 6,205,909 | B1 | 3/2001 | Giannelli |
| 6,237,811 | B1 | 5/2001 | Ford |
| 6,240,829 | B1 | 6/2001 | McGarrah |
| D445,292 | S | 7/2001 | Sowden |
| 6,253,664 | B1 | 7/2001 | Giannelli |
| 6,253,667 | B1 | 7/2001 | Lüssi |
| D449,198 | S | 10/2001 | Cahen |
| D455,596 | S | 4/2002 | Boos |
| 6,419,120 | B1 | 7/2002 | Bertone |
| 6,634,280 | B2 | 10/2003 | Sowden |
| D481,901 | S | 11/2003 | Daniels |
| D486,346 | S | 2/2004 | Jönsson |
| 6,726,950 | B2 | 4/2004 | Yuzawa |
| D495,915 | S | 9/2004 | Cahen |
| 6,994,231 | B2 | 2/2006 | Jones |
| 7,021,206 | B2 | 4/2006 | Eckenhausen |
| 7,066,079 | B2 | 6/2006 | Sager |
| 7,147,131 | B2 | 12/2006 | Sher |
| D536,204 | S | 2/2007 | Isett |
| D556,493 | S | 12/2007 | Isett |
| 7,322,275 | B2 | 1/2008 | Lüssi |
| 7,507,430 | B2 | 3/2009 | Stearns |
| 7,537,138 | B2 | 5/2009 | Saggin |
| 7,673,555 | B2 | 3/2010 | Nosler |
| 2003/0145736 | A1 | 8/2003 | Green |
| 2004/0168465 | A1 | 9/2004 | Renken |
| 2005/0172833 | A1 | 8/2005 | Ioannone |
| 2006/0034987 | A1 | 2/2006 | Thakur |
| 2008/0264266 | A1 * | 10/2008 | Carbonini et al. ......... 99/289 R |
| 2009/0158937 | A1 | 6/2009 | Stearns |
| 2011/0212229 | A1 * | 9/2011 | McLaughlin et al. ....... 426/231 |
| 2011/0212231 | A1 * | 9/2011 | McLaughlin ............. 426/231 |

FOREIGN PATENT DOCUMENTS

| | | |
|---|---|---|
| EP | 0 508 703 A2 | 10/1992 |
| EP | 1 867 257 A1 | 12/2007 |
| EP | 186257 | 12/2007 |
| EP | 2140788 | 1/2010 |
| JP | 2008-543458 | 12/2008 |
| KR | 10-0219010 B1 | 9/1993 |
| KR | 10-029010 | 9/1999 |
| KR | 10-2005-0044530 | 5/2005 |
| KR | 10-2005-0044530 A | 5/2005 |
| KR | 10-2008-0068664 | 7/2008 |
| KR | 10-2008-0068664 A | 7/2008 |
| WO | 2007/027206 A2 | 3/2007 |
| WO | 2007/035877 A2 | 3/2007 |

OTHER PUBLICATIONS

International Search Report and Written Opinion mailed Nov. 25, 2011, issued in corresponding International Application No. PCT/US2011/026754, filed Mar. 1, 2011, 11 pages.

* cited by examiner

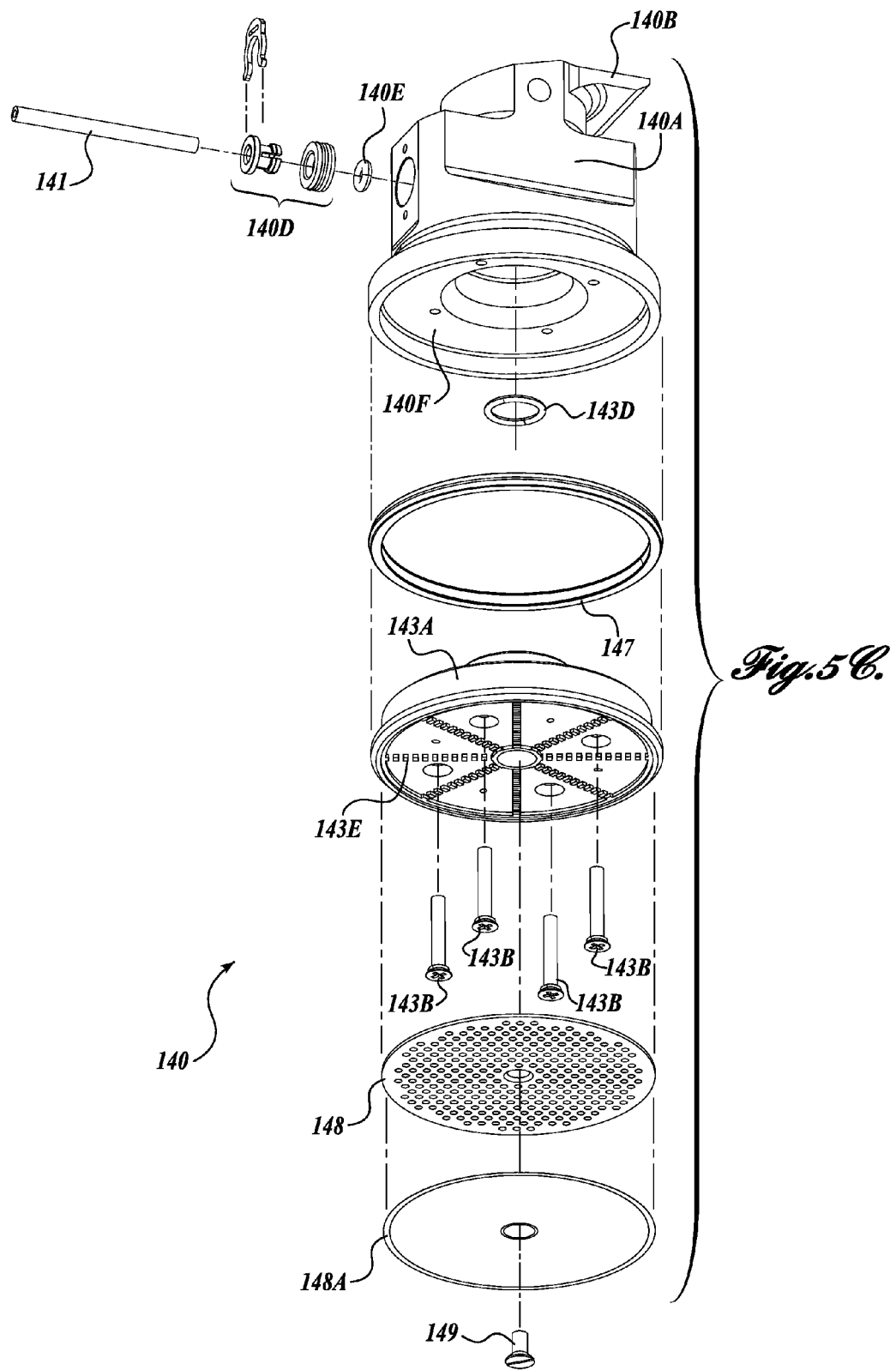

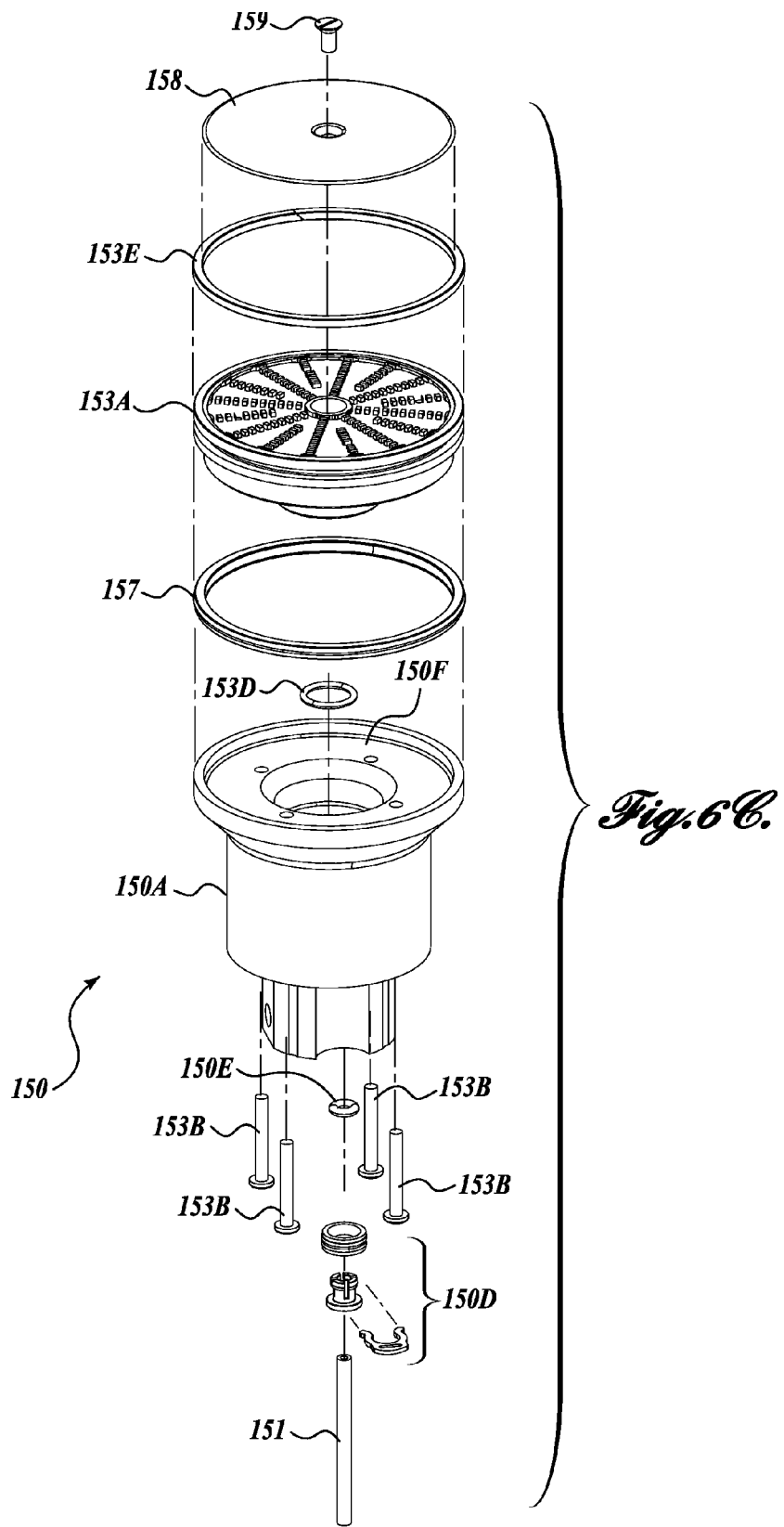

ACCELERATED LOW PRESSURE BREWER AND A METHOD FOR MAKING A BEVERAGE

CROSS-REFERENCE TO RELATED APPLICATION

This application claims the benefit of Provisional Application No. 61/309,401, filed Mar. 1, 2010, the entire disclosure of which is hereby incorporated by reference herein.

BACKGROUND

Coffee preparation, that is, the process of producing a beverage using the coffee bean, typically requires four basic steps be performed: (i) the raw coffee beans are roasted; (ii) the roasted coffee beans are ground; (iii) the ground coffee beans are brewed, i.e., mixed with hot water for a period of time; and (iv) the liquid coffee beverage is separated from the unwanted grounds. Additional steps may include, for example, adding milk, sweetener, flavorings, and/or other additives to the brewed liquid. Typically in much of the world, the roasted coffee beans are purchased by the user, who then performs the remaining steps. Various coffee brewing systems are known in the art, ranging from personal brewers such as drip coffee makers and French presses, to large commercial systems used for producing a dizzying array of flavored espresso-based beverages.

Ground coffee may be brewed in a number of different ways that may be categorized into four basic methods (as discussed in http://en.wikipedia.org/wiki/Coffee_preparation). The four methods are (1) boiling, for example placing ground coffee into a cup and pouring hot water over the grounds, allowing the grounds to settle; (2) steeping, for example, placing ground coffee into a French press and waiting a few minutes before depressing the filtered plunger and pouring the brewed liquid into a cup; (3) filtration, for example drip brewing wherein the ground coffee is placed in a filter holder and hot water drips onto the coffee grounds into a carafe or the like; and (4) pressure methods, for making espresso wherein hot water typically between 91° C. and 96° C. is forced under a pressure of between eight and nine atmospheres through a lightly packed matrix or "puck" of finely ground coffee.

The different brewing methods have various disadvantages. For example, boiling and steeping methods require some time, typically 4-7 minutes, to produce an optimally flavored beverage. Filtration methods may be quicker, but do not produce the full bodied coffee that many consumers prefer, and/or may require more coffee grounds to produce an acceptable flavor. Espresso may be relatively quick, but requires relatively high pressures (8-9 atmospheres). Moreover, the high pressures are typically produced by steam, and the relatively high temperatures and pressures produce a very strong and distinctive flavor that some consumers may not prefer.

Similar considerations apply to other brewable beverages, such as teas and the like, which may be similarly brewed.

There is a need, therefore, for a system and method for brewing coffee and other beverages that retains the benefits associated with brewing coffee grounds that are suspended in the heated water, with the rapid brewing associated with pressure brewing methods.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A brew group for a beverage brewing system is disclosed that includes a brewing chamber, for example a block having a cylindrical aperture therethrough, a lower piston assembly that slidably engages a bottom end of the cylindrical aperture, and an upper piston assembly that is configured to slidably engage the upper end of the cylindrical aperture. A first actuator is operable to move the lower piston assembly longitudinally through the cylindrical aperture, and a second actuator is operable to move the upper piston assembly between a load position and a brewing position. In the load position the upper piston assembly is disposed above the cylindrical aperture and pivoted away. In the brewing position the upper piston sealingly engages the cylindrical aperture. A sliding arm assembly is disposed on the upper surface, and is hingedly attached to a third actuator that is configured to slide the assembly over the upper surface of the brewing chamber.

In an embodiment, the lower piston assembly defines a flow channel therethrough fluidly connecting the brewing chamber with an external water supply tube.

In an embodiment, the lower piston assembly and/or the upper piston assembly each comprises a first piston member and a second piston member that is removably attached to the first piston member, and cooperatively defines an annular peripheral groove. A seal ring is disposed in the annular peripheral groove. The seal ring(s), therefore, may be positioned between the first and second piston members prior to assembly, such that they do not need to be stretched over the diameter of the upper or lower piston members.

In an embodiment, the first piston member defines a flow channel therethrough, and the second piston member defines a plurality of flow channels therethrough that fluidly engage the first piston member flow channel, and an O-ring seals the flow channel joint.

In an embodiment, a perforated plate is attached to a distal face of the second piston member such that a flow path is defined between the distal face of the second piston member and the perforated plate.

In an embodiment the first and second actuators comprises lead screw assemblies.

In an embodiment a lever arm is defined on the upper piston assembly and a fixed spring member is provided that engages the lever arm as it is moved from the brewing position to the load position, and the engagement causes the upper piston assembly to pivot away from the cylindrical aperture.

In another aspect, a method is disclosed for producing a brewable beverage. A brew group having (i) a brewing chamber defining a cylindrical aperture having an open first end and an open second end, (ii) a lower piston assembly that slidably engages the open first end of the cylindrical aperture, (iii) an upper piston assembly movable between a load position wherein the upper piston assembly is disposed above the cylindrical aperture and pivoted away from the cylindrical aperture, and a brewing position wherein the upper piston assembly sealingly engages the open second end of the cylindrical aperture, and (iv) a sliding arm assembly configured with an actuator, the sliding arm assembly being configured to slide over the open second end of the cylindrical aperture, wherein the sliding bar assembly is hingedly attached to the actuator. Brewable material is deposited into the brewing chamber, and the upper piston assembly is moved from the load position to the brewing position. A flow of heated water through the lower piston assembly into the brewing chamber is initiated. After allowing the product to brew, a portion of the brewed liquid is forced out of the brewing chamber through the upper piston assembly. The lower piston assembly is moved upwardly to compress the material between the upper piston assembly and the lower piston assembly. The upper piston assembly is then moved to the load position and the lower piston assembly is moved to be flush with the upper end of the brewing chamber. The sliding arm assembly is then activated to remove the brewable material from the lower piston assembly.

A system utilizing the brew group is disclosed that additionally comprises a hopper configured to dispense coffee beans, a grinder configured to receive coffee beans from the hopper and to dispense ground coffee, and a reservoir of heated water that includes an internal heating element; and a programmable controller operably connected to control operation of the hopper, the grinder, the reservoir, the first actuator, the second actuator, and the slidable means.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5C is an exploded view of the upper piston assembly.

FIG. 6C is an exploded view of the lower piston assembly;

DETAILED DESCRIPTION

Figure 1:
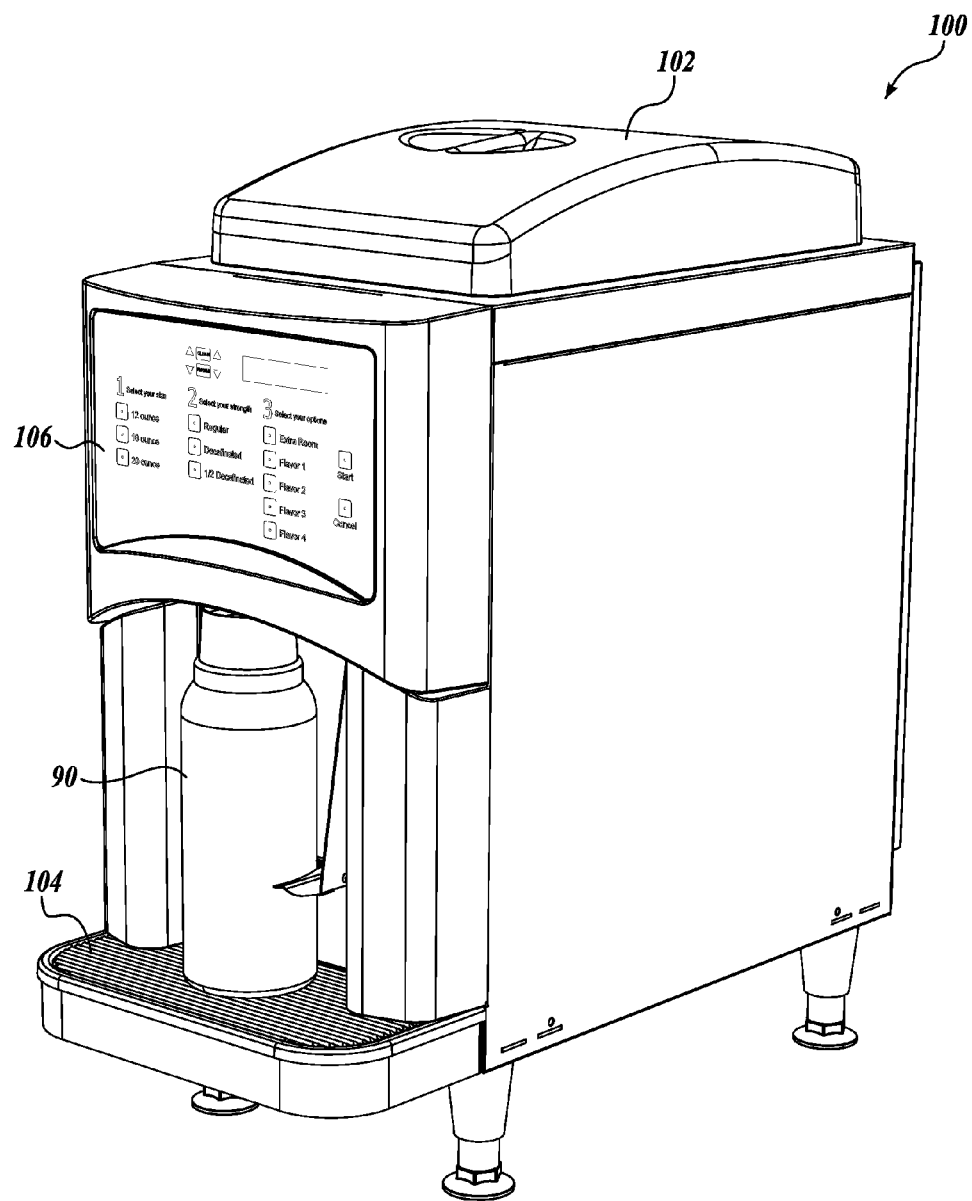
FIG. 1 is a front-right perspective environmental view of a beverage brewing system in accordance with the present invention.
Figure 2:
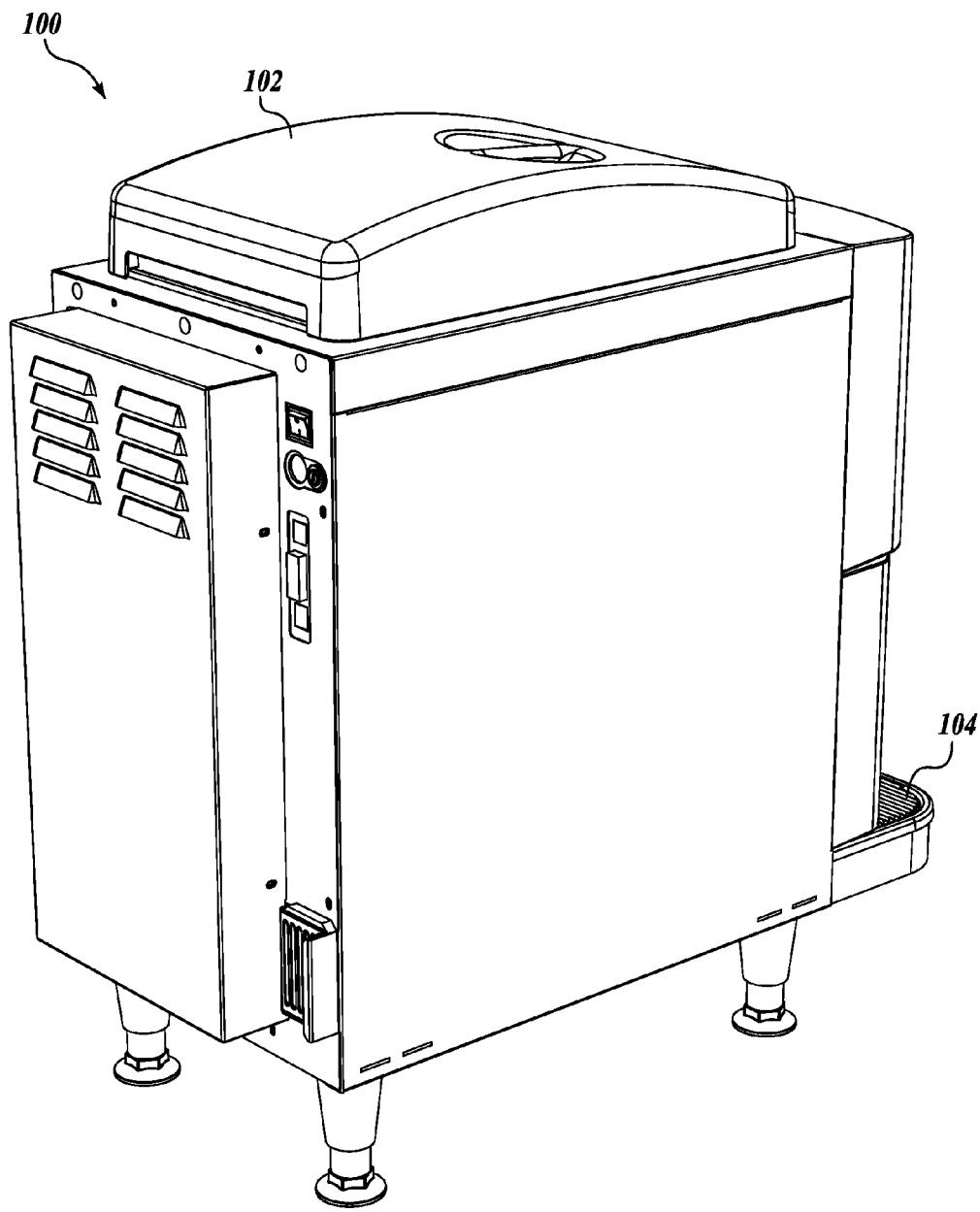
FIG. 2 is a rear-left perspective view of the beverage brewing system shown in FIG. 1.

A particular embodiment of a brewing system in accordance with the present invention will now be described with reference to the figures, wherein like numbers indicate like parts. FIGS. 1 and 2 show perspective environmental views of a brewing system 100 in accordance with the present invention, having a hopper 102 disposed at a top of the system 100, and holding a carafe 90 in the dispensing area 104. A beverage selection panel 106 is shown generally above the dispensing area 104. It is contemplated that the hopper may define a plurality of selectable compartments containing different brewable materials, for example different types or species of coffee beans. For example, the beverage selection panel 106 may give users the option to select a beverage size (e.g., 12, 16, or 20 ounces), among beverage choices (e.g., regular coffee, decaffeinated coffee, tea), and/or among flavoring or other additive options (e.g., creamer, sweetener, syrup flavors).

The brewing system 100 may be suitable for brewing various brewable materials, such as ground coffee, tea, or the like. Although the following discussion may refer specifically to coffee brewing systems in places, it will be understood that the teachings of the present invention may similarly be applied to other brewing systems, including tea brewing systems.

Figure 3:
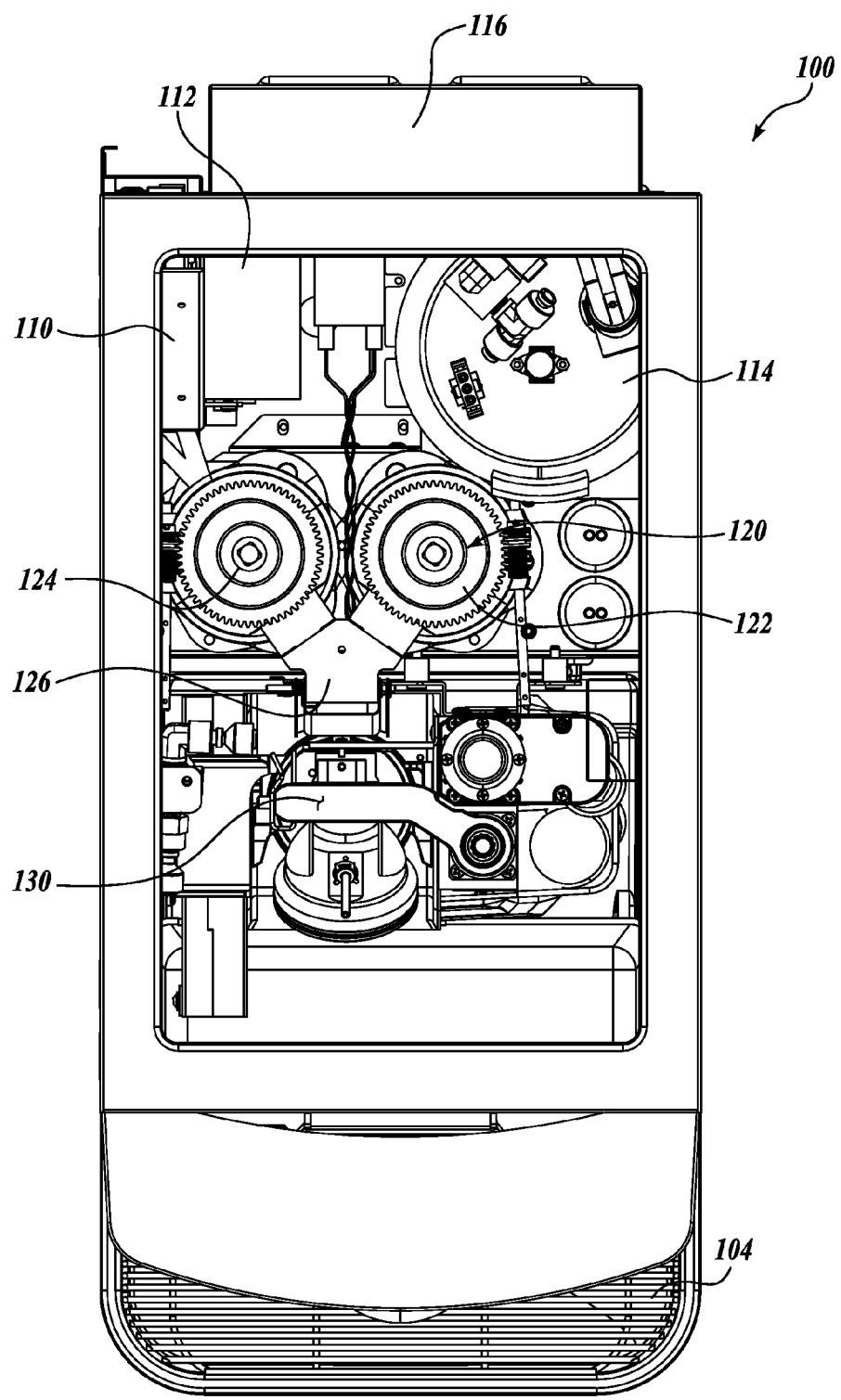
FIG. 3 is a plan view of the beverage brewing system shown in FIG. 1, with some outer panels removed to expose interior components.

FIG. 3 shows a top view of the brewing system 100 with the hopper 102 and certain upper panels removed to expose internal components. In this embodiment the brewing system 100 includes a brew group controller 110, a power supply 112, an optional flavoring controller 116 and a water heater/reservoir 114. A grinder assembly 120 comprising two grinders 122, 124 is positioned to receive product, for example coffee beans, from the hopper 102. The brewable product from the grinder assembly 120 is expelled through a shared chute base 126, and a chute assembly 160.

Figure 4:
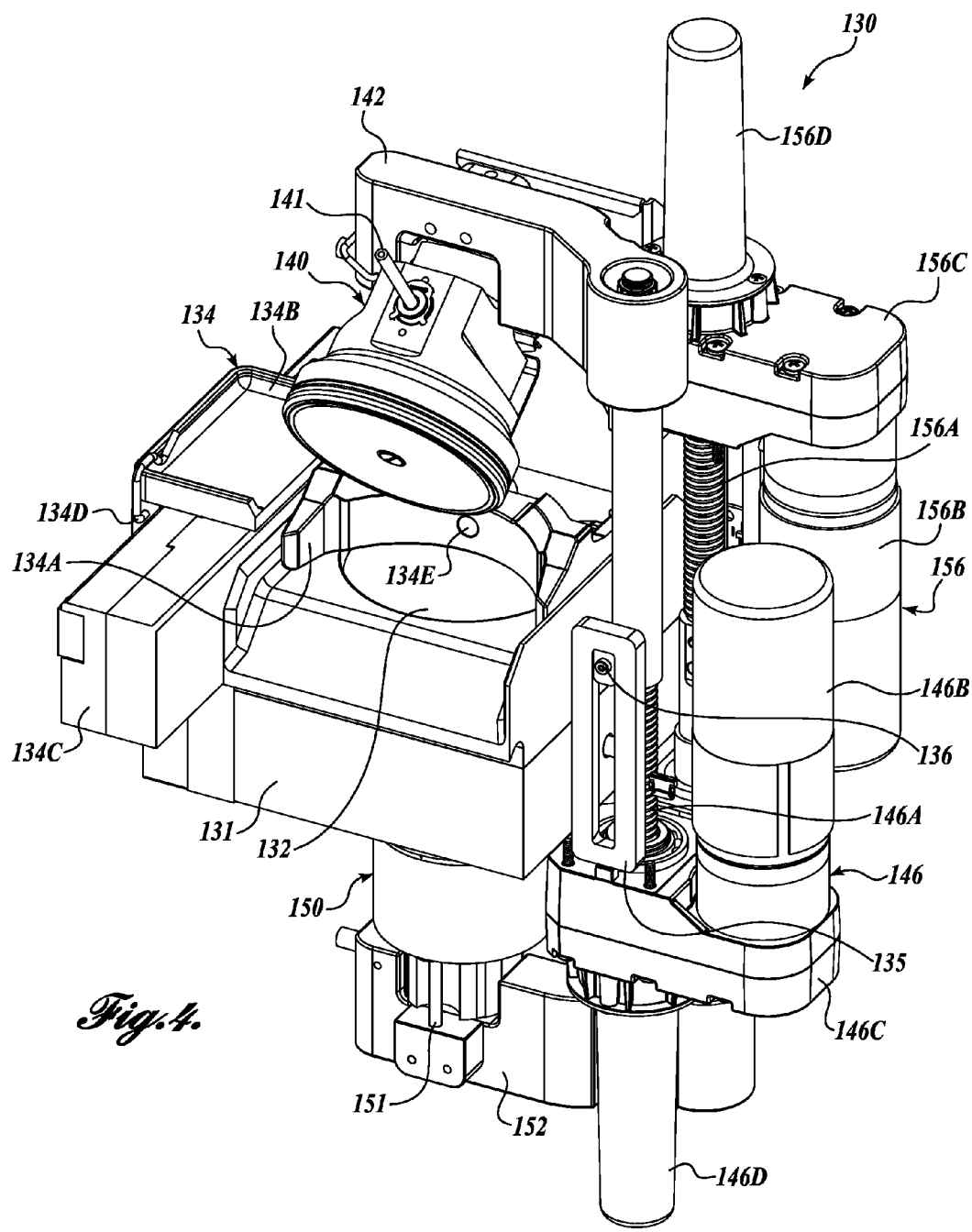
FIG. 4 is a perspective view showing the brew group for the beverage brewing system shown in FIG. 1.

A brew group 130 is plumbed to receive hot water from the reservoir 114 and configured to receive brewable product from the grinding assembly 120. FIG. 4 is a perspective view of an exemplary brew group 130 in accordance with the present invention. The brew group 130 includes a cylindrical brewing chamber 132, currently formed with a cylindrical sleeve disposed in a block assembly 131. The brewing chamber 132 is positioned to receive coffee grounds from the grinder assembly 120 (FIG. 3). In a currently preferred embodiment the brewing chamber defines a cylindrical volume between 2 inches and 3.5 inches in diameter, and a height between 2.5 inches and 5.0 inches.

A sliding arm assembly 134 is slidably disposed over the brewing chamber 132, and is configured to push spent grounds or other brewed material off of the block assembly 131. In this embodiment the sliding arm assembly 134 includes a C-shaped arm 134A that extends across the width of the brewing chamber 132. The lower transverse edges of the C-shaped arm 134A are beveled. The arm 134A is drivably attached to a drive arm subassembly 134B. The drive arm subassembly 134B is movable linearly by an actuator 134C such that the C-shaped arm 134A is controllably movable across the upper surface of the block assembly 131. In the current embodiment, the actuator 134C comprises an electric motor-driven worm gear system with a toothed belt (not shown) that drivably engages the drive arm subassembly 134B.

Although not required for the present invention, the actuator 134C, and the piston actuators discussed below, are preferably configured with encoders (not shown) to enable precise positioning of the various elements. In a current embodiment rotational sensors/encoders are provided on the drive motors, and linear sensors/encoders are provided on the drive shafts, to enable precise positional control. Exemplary sensors are Hall-effect sensors with magnets.

A novel aspect of the illustrated sliding arm assembly 134 is the flexibility of the assembly, which provides a very reliable and effective mechanism for removing spent coffee grounds, as discussed below. In particular, the drive arm subassembly 134B slides along an upper surface of the actuator 134C, and includes a spring-loaded hinged connection 134D. A portion of the drive arm subassembly 134B extends behind the C-shaped arm 134A (see FIG. 7E) and is connected thereto with a pivot 134E. The flexibility of the sliding arm assembly 134 provides a very reliable mechanism for scraping spent grounds from the block assembly 131.

The brew group 130 further includes an upper piston assembly 140 that is pivotably attached to an upper support arm 142. The upper piston assembly 140 is movable between a load position (shown in FIG. 4) and a brewing position (FIG. 7B) as discussed below, and is sized and configured to sealingly engage the brewing chamber 132 from an open top end of the chamber 132. The upper piston assembly 140 includes a dispensing tube 141 that dispenses the brewed beverage. The upper piston assembly 140 is described in more detail below.

The upper support arm 142 is attached to a linear actuator. In this embodiment the linear actuator is a first lead screw assembly 146 comprising a lead screw 146A that is selectively and programmably driven with an electric motor 146B. A drive belt assembly 146C couples the motor 146B with the lead screw 146A. A protective cover 146D is disposed below the lead screw 146A and configured to receive and partially enclose the distal end of the lead screw 146A during operation. As discussed in more detail below, the upper piston assembly 140 is configured to pivot from the brewing position when it engages the brewing chamber 132, to the load position wherein the upper piston assembly 140 is pivoted away from the brewing chamber 132, to provide better access for loading brewable material into the brewing chamber 132 and to avoid interference with the sliding arm assembly 134. It will be appreciated by persons of skill in the art the pivotable upper piston assembly 140 reduces the height or head room required by the brew group 130.

The brew group 130 further includes a lower piston assembly 150 that is pivotably attached to a lower support arm 152. The lower piston assembly 150 is sized and configured to sealingly engage the brewing chamber 132 from an open bottom end of the chamber 132, and includes a water supply tube 151. The lower piston assembly 150 is described in more detail below. The lower support arm 152 is attached to a linear actuator, which in this embodiment comprises a second lead screw assembly 156, similar to, and inverted relative to, the first lead screw assembly 146 described above. The second lead screw assembly 156 includes a lead screw 156A, and an electric motor 156B that drivably and programmably engages the lead screw 156A through a drive belt assembly 156C. A protective cover 156D is also provided to receive the distal portion of the lead screw 156A during operation. Although, as described below, the lower piston assembly 150 does not disengage from the brewing chamber 132 during the brewing cycle, it the preferred embodiment the lower piston assembly 150 is pivotably attached to the lower support arm 152, which is configured to enable the lower piston assembly 150 to be moved away from the brewing chamber 132. This provides advantages in cleaning and servicing the system 100.

The lead screw assemblies 146, 156 further include a guide slot 135 and anti-rotation pin 136 (only one anti-rotation device 135, 136 visible in FIG. 4) to assure the corresponding piston moves only longitudinally.

Figure 5A:
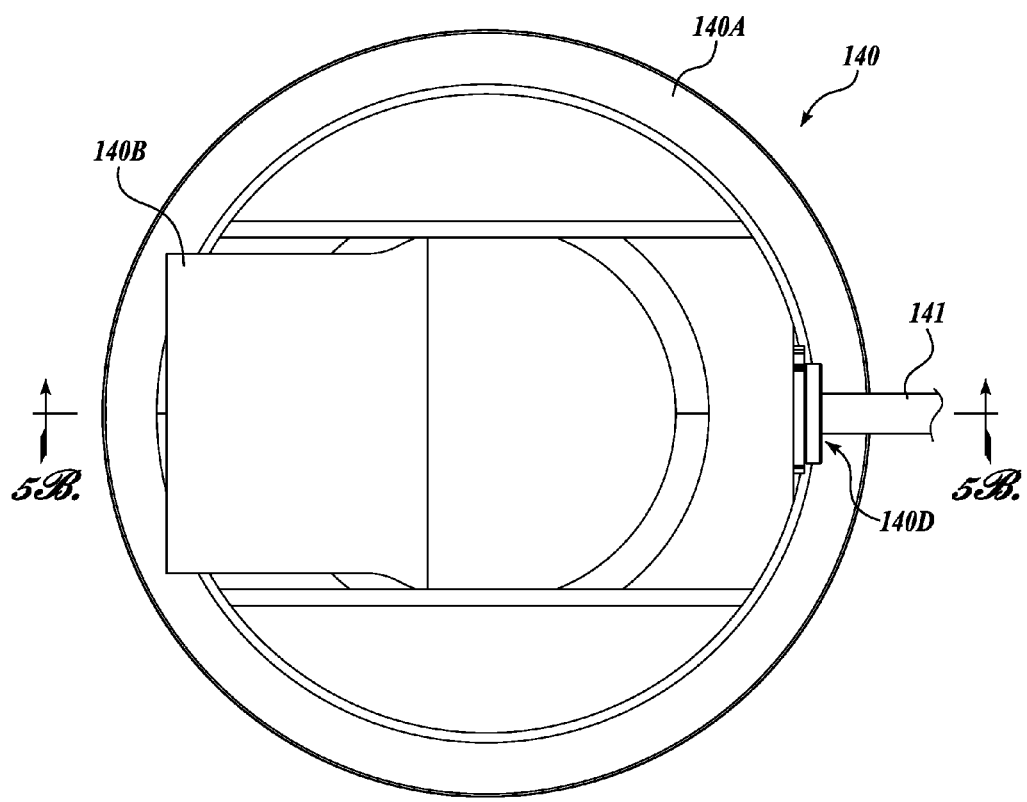
FIG. 5A is a top view of the upper piston assembly of the brew group shown in FIG. 4.
Figure 5B:
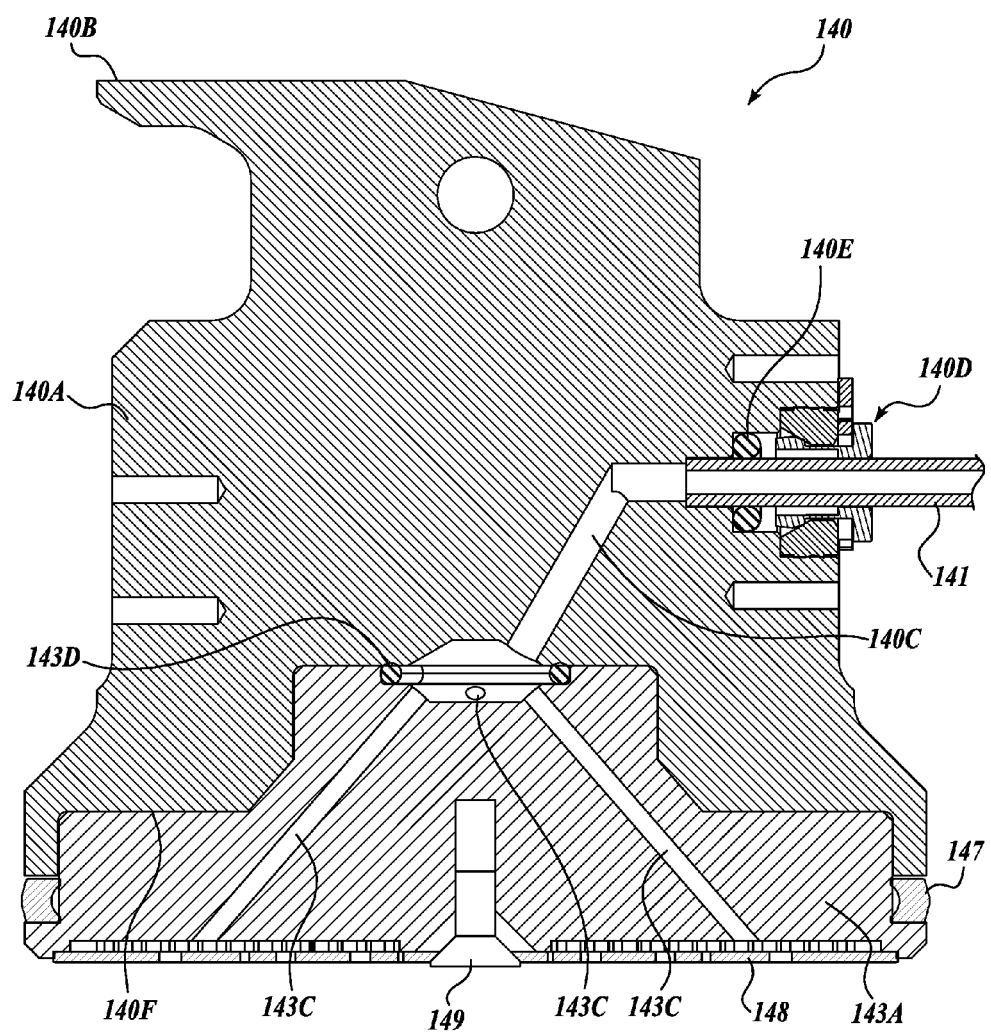
FIG. 5B is a section view through section 5B-5B of the upper piston assembly.

FIG. 5A shows a top view of the upper piston assembly 140; FIG. 5B shows a cross section of the upper piston assembly 140 through section 5B-5B; and FIG. 5C shows an exploded view of the upper piston assembly 140. The upper piston assembly 140 defines a piston having a first piston member 140A that is configured to pivotably attach to the upper support arm 142, and includes a fixed lever arm 140B to facilitate pivoting the piston assembly 140. As seen in FIG. 4B, a channel 140C is defined from a front face of the first piston member 140A and extending to a lower face 140F. In the present embodiment the channel 140C includes two straight segments and a larger distal end opening at the lower face. The dispensing tube 141 is attached to the first piston member 140A with a half cartridge fitting 140D and O-ring 140E, to fluidly and sealingly engage the channel 140C. A shaped recess 140F defines the lower face of the first piston member 140A.

A second piston member 143A is configured to nest with and engage the shaped recess 140F as seen most clearly in FIG. 5B. The second piston member 143A is removably attached to the first piston member 140A with a plurality of fasteners 143B (FIG. 5C). A plurality of channels 143C extend through the second piston member 143A and fluidly engage the channel 140C in the first piston member 140A. An O-ring 143D is provided to seal the connection between the channel 140C and the plurality of channels 143C. The channels 140C, 143C therefore cooperatively define a plurality of fluid paths that extend from the lower face of the second piston member 143A to the dispensing tube 141.

The first and second piston members 140A, 143A define an outer annular channel therebetween that is sized and configured to receive and retain a seal ring 147 that is configured to engage the cylindrical brewing chamber 132. A particular advantage of the two-member construction of the upper piston assembly 140 is that the ring seal 147 does not have to stretch over the outer piston diameter to engage the annular channel. It will be appreciated by persons of skill in the art that this allows the user of a stiffer material for the ring seal 147 and avoids risk of plastically deforming the ring seal 147, which must provide a seal for the hot brewed beverage and repeatedly engage and disengage the brewing chamber 132.

A perforated plate 148 is removably attached to the bottom face of the second piston member 143A with a fastener 149. In the current embodiment the bottom face of the second piston member 143A is configured with a plurality of intermittent ridges 143E that hold the perforated plate 148 away from the lower face of the second piston member 143A, to facilitate liquid flow to the channels 143C. The perforated plate 148 may also be provided with a replaceable micro-screen filter 148A or the like.

Figure 5D:
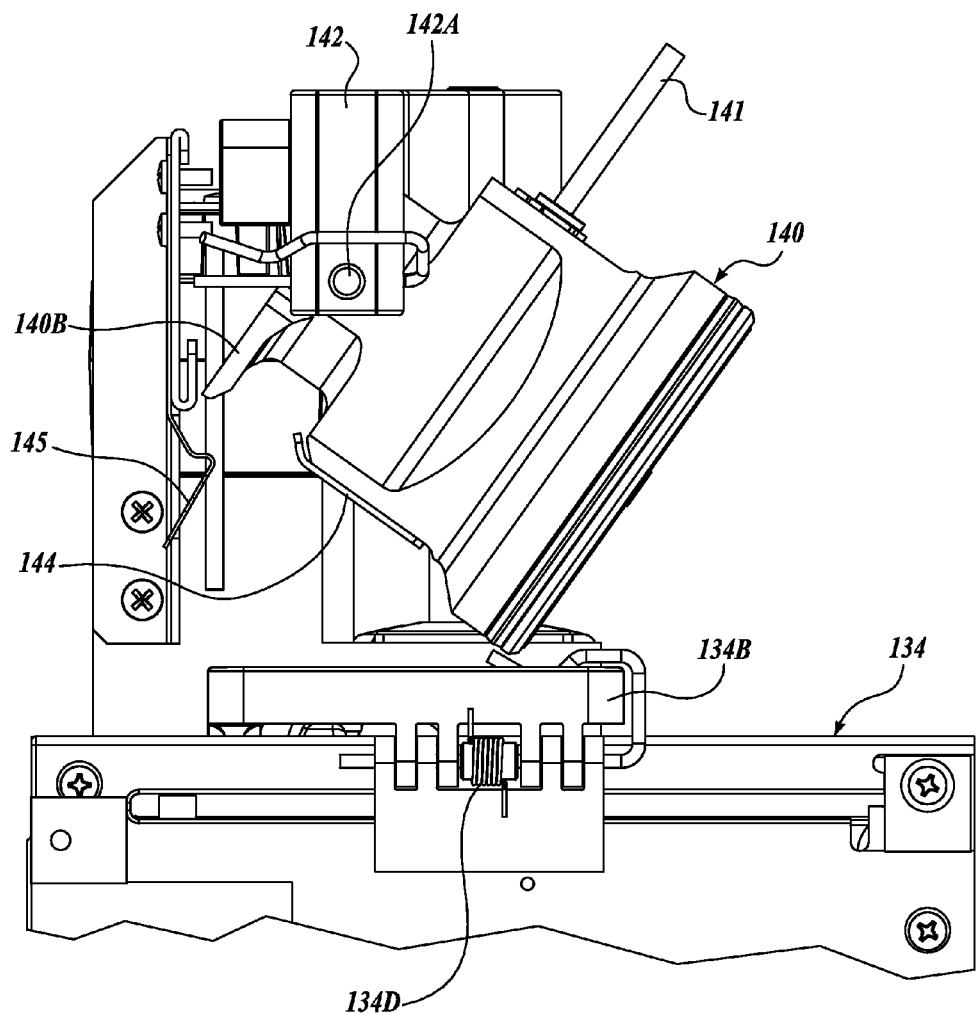
FIG. 5D is a detail view of the upper piston assembly.

FIG. 5D shows a fragmentary side view of the upper piston assembly 140 in the pivoted or load position. In the load position the upper piston assembly 140 is pivoted away from the brewing chamber 132. In the current embodiment the fixed lever arm 140B engages an angled spring member 145 as the upper piston assembly 140 is moved upwardly. The angled spring member 145 is positioned such that the fixed lever arm 140B causes the piston to pivot about the pivot pin 142A as it engages and travels by the angled spring member 145. When the upper piston assembly 140 is moved down during the brewing cycle, the bracket for the angled spring member 145 engages the fixed lever arm 140B causing the upper piston assembly 140 to pivot back toward the upright brew position, as discussed in more detail below.

Figure 6A:
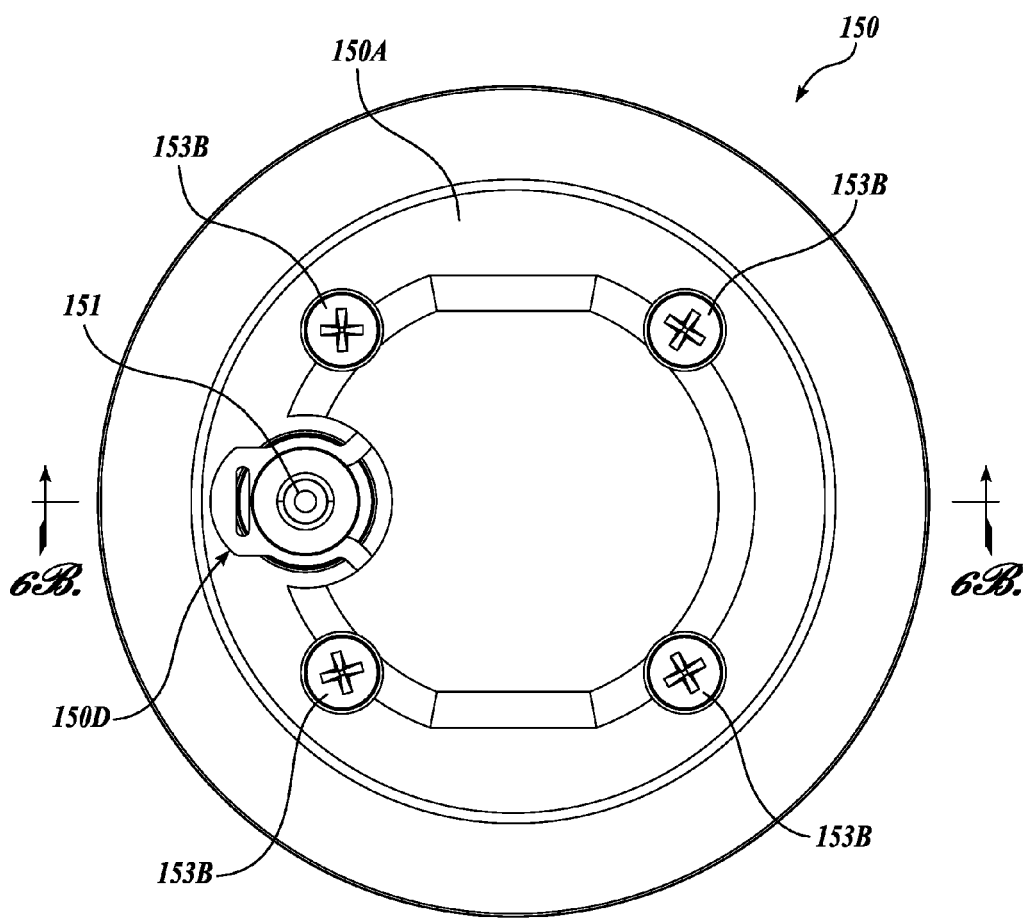
FIG. 6A is a bottom view of the lower piston assembly of the brew group shown in FIG. 4.
Figure 6B:
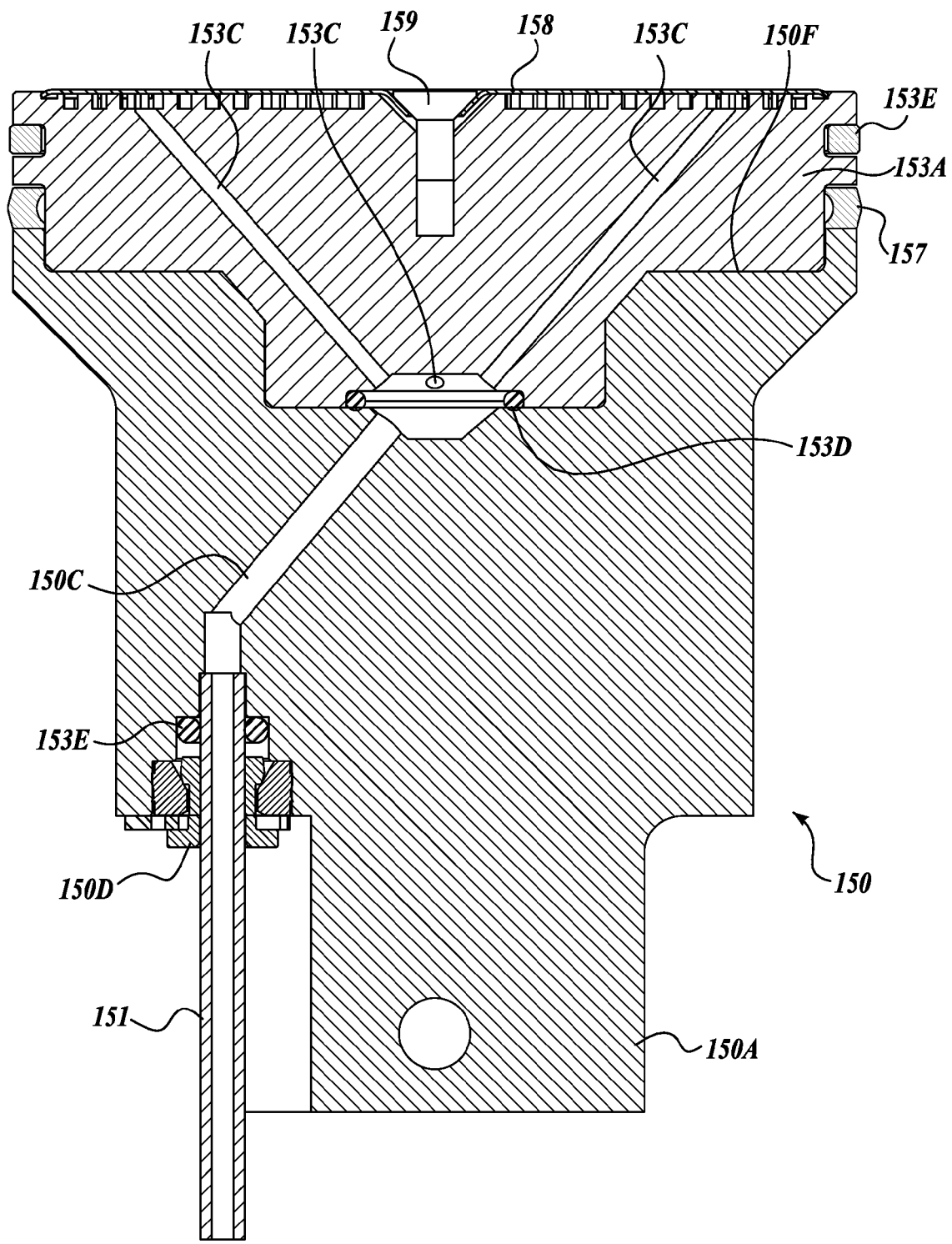
FIG. 6B is a section view through section 6B-6B of the lower piston assembly.

FIG. 6A shows a bottom view of the lower piston assembly 150; FIG. 6B shows a section view of the lower piston assembly 150 through 6B-6B; and FIG. 6C shows an exploded view of the lower piston assembly 150. The lower piston assembly 150 includes a first piston member 150A configured to attach to the lower support arm 152 (FIG. 4). As seen most clearly in FIG. 6B, a channel 150C extends from a lower opening in the first piston member 150A to an upper face 150F. The water supply tube 151 is attached to the first piston member 150A with a half cartridge fitting 150D and O-ring 150E to fluidly and sealingly engage the channel 150C. A shaped recess 150F defines the lower face of the first piston member 150A.

A second piston member 153A is configured to nest with and engage the shaped recess 150F, and is removably attached thereto with a plurality of fasteners 153B. A plurality of channels 153C extend through the second piston member 153A and fluidly engage the channel 150C in the first piston member 150A. An O-ring 153D is provided to seal the connection. The channels 150C, 153C therefore cooperatively define a plurality of flow paths that extend from the water supply tube 151 to the upper face of the second piston member 153A.

As with the assembly described above, the first and second piston members 150A, 153A are configured to receive and retain a seal ring 157 therebetween that engages the brewing chamber 132. Optionally, the second piston member 153A may further include a wiper ring 153E. A lower piston screen 158 is removably attached to the second piston member 153A with a fastener 159.

The operation of the brew group 130 will now be described with reference to FIGS. 7A-7E, which illustrate the brew group 130 in isolation with a portion of the brew chamber 132 cut away, at various stations in the brew cycle. Refer also to FIG. 3 for referenced components not shown in FIGS. 7A-7E for clarity. It is contemplated that the operation of the components of the brewing system 100 will be automatically controlled by the controller 110 and related systems, in response to the specific beverage request entered by a user from the beverage selection panel 106. Alternate means for entering a beverage request are also contemplated, for example using remote beverage entering system that is in signal communication with the brewing system 100, wirelessly (e.g., using RF, Bluetooth®, or the like) or using a card reading system, or the like.

Figure 7A:
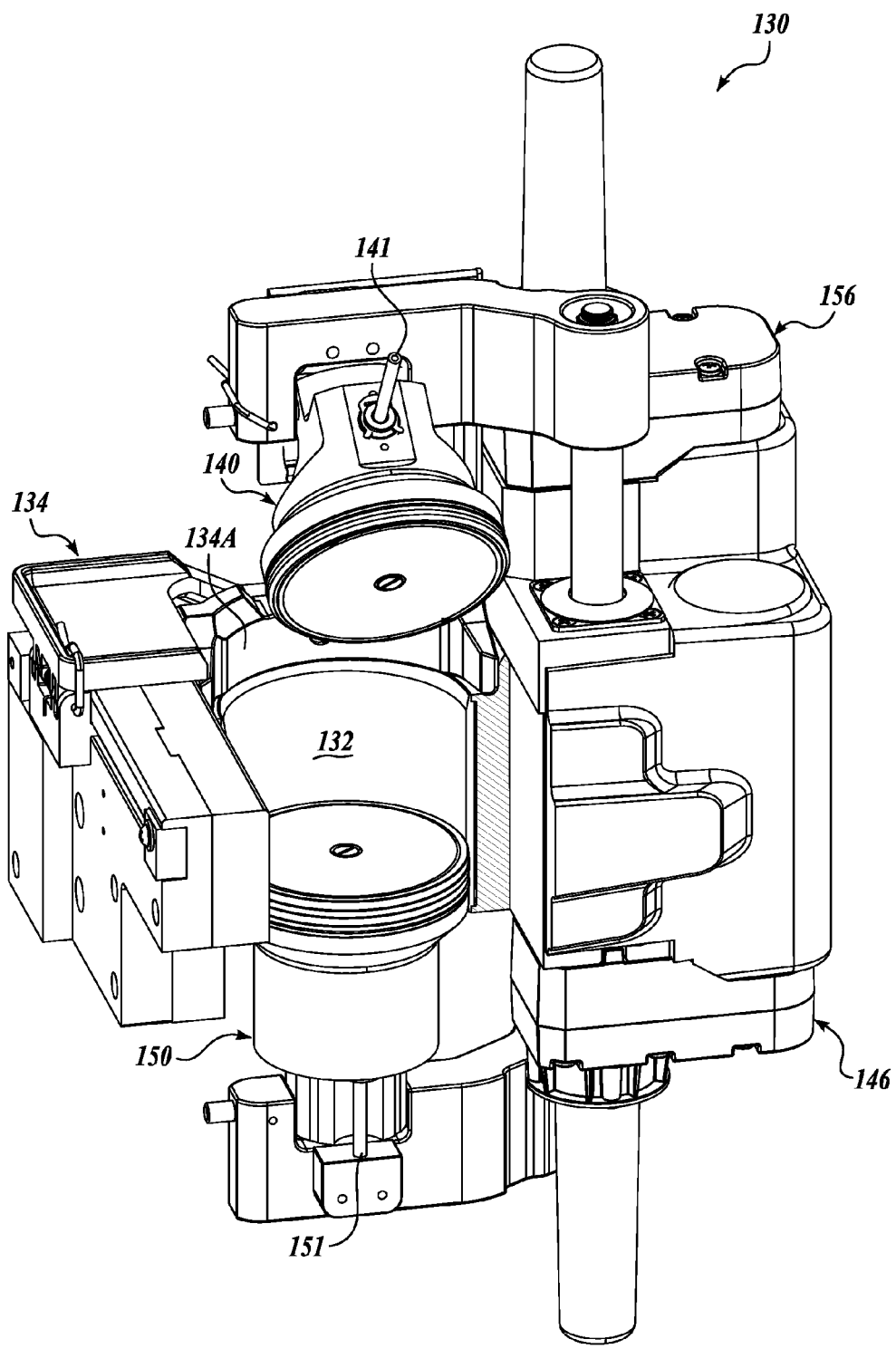
FIGS. 7A-7E illustrate the brew group shown in FIG. 4 with the brewing chamber partially cut away, in various positions during the brewing cycle.

FIG. 7A shows the brew group 130 in position to receive brewable material, for example ground coffee from the grinder assembly 130. The lower piston assembly 150 sealingly engages the brewing chamber 132, positioned near the lower end of the chamber 132 by the second lead screw assembly 156. The upper piston assembly 140 is positioned upwardly away from the brewing chamber 132 by the first lead screw assembly 146, and pivoted to the load position, as discussed above. Brewable material from the grinder assembly 120 is received into the brewing chamber 132.

Figure 7B:
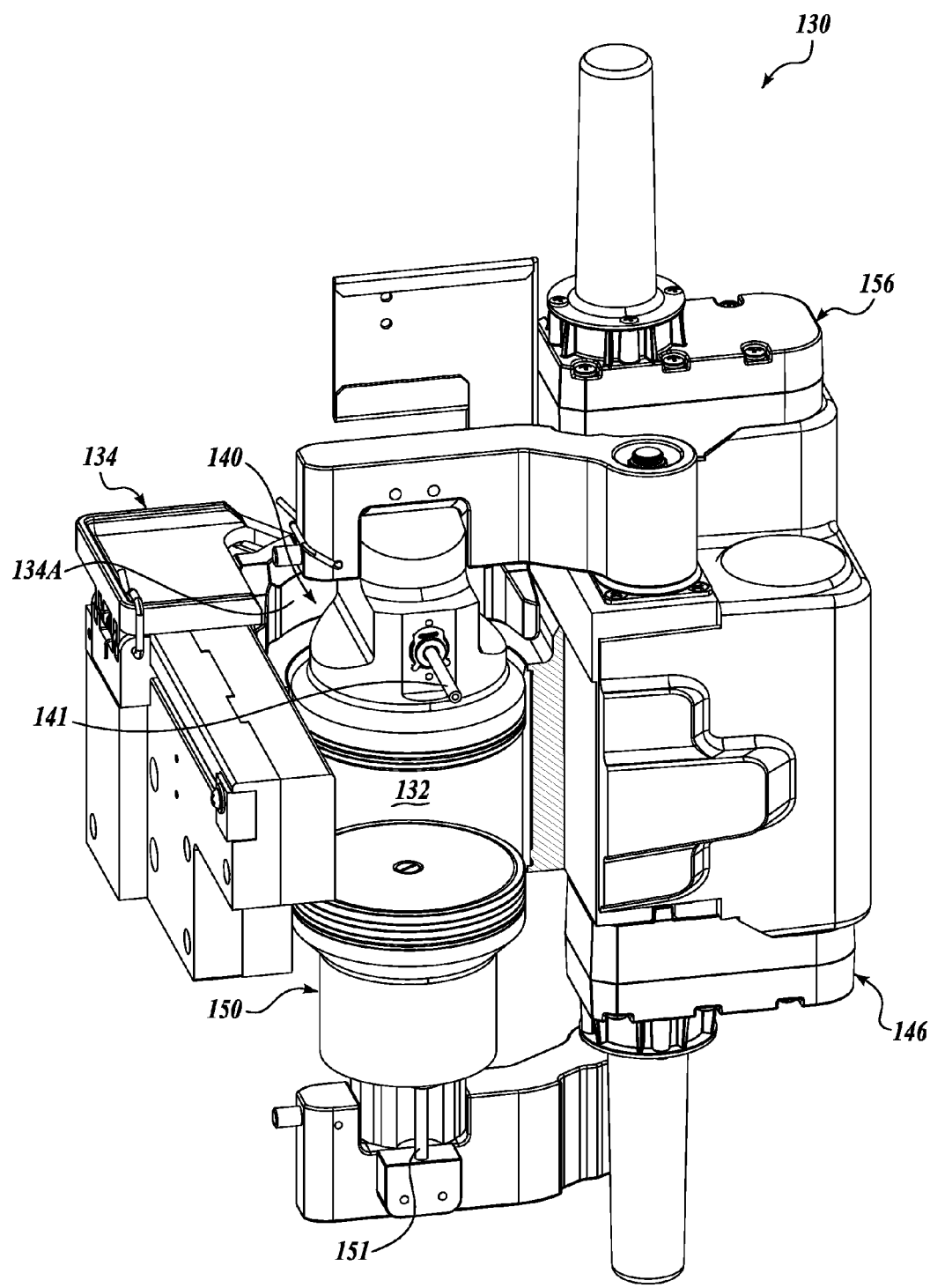

As illustrated in FIG. 7B, the upper piston assembly 140 is moved to the brewing position to sealingly engage an upper end of the brewing chamber 132. As the upper piston assembly 140 is moved downwardly, it pivots to a vertical orientation or brew position. It is contemplated that the vertical position of the lower piston assembly 150 may also be adjusted, for example to accommodate the selected beverage size. For example, if a "small" or "8 ounce" beverage was selected, the lower piston assembly 150 may be moved upwardly in the brewing chamber 132. Valves (not shown) are positioned to close liquid egress from the brewing chamber 132, and to fluidly connect the heated water reservoir 114 to the water supply tube 151, to initiate the flow of hot water through the lower piston assembly 150 and into the brewing chamber 132. Preferably the water pressure is maintained at a desired value to optimize brewing quality and/or speed. Preferably a nominal pressure in the range between 10 and 100 psig is maintained, and more preferably in the range of 20-60 psig for coffee or in the range of 10-50 psig for other brewable product such as tea.

When the desired amount of water and the desired pressure has been provided, the water supply may optionally be stopped to provide a desired time for brewing. It will be appreciated by persons of skill in the art that the pressurized brewing chamber 132, although lower in pressure than espresso makers, will nevertheless accelerate the brewing process as compared to prior art systems wherein the brewing chamber is not pressurized. In the current embodiment, the pressurized water supply from the heater/reservoir is regulated to provide a desired pressure. It is contemplated that the regulated pressure may be between 10 and 100 psig.

In a first embodiment or mode of operation of the system 100, the water flow is resumed (or maintained) and a dispensing valve (not shown) is opened to initiate the flow of brewed beverage through the upper piston assembly channels 140C, 143C to the dispensing tube 141, and then ultimately dispensed to the cup, carafe or other container 90. In an alternative second mode of operation, the lower piston assembly 150 is moved upwardly through the brewing chamber 132, to cause the brewed liquid flow through the upper piston assembly 140 and to the dispensing tube 141.

The first mode of operation will produce a different quality of beverage than the second mode because the grounds are not compressed until after the user beverage has been dispensed. Therefore, coffee (or tea) components released in the compression process will not be dispensed to the user. However, the system must then dispose of the remaining liquid in the brewing chamber 132.

Figure 7C:
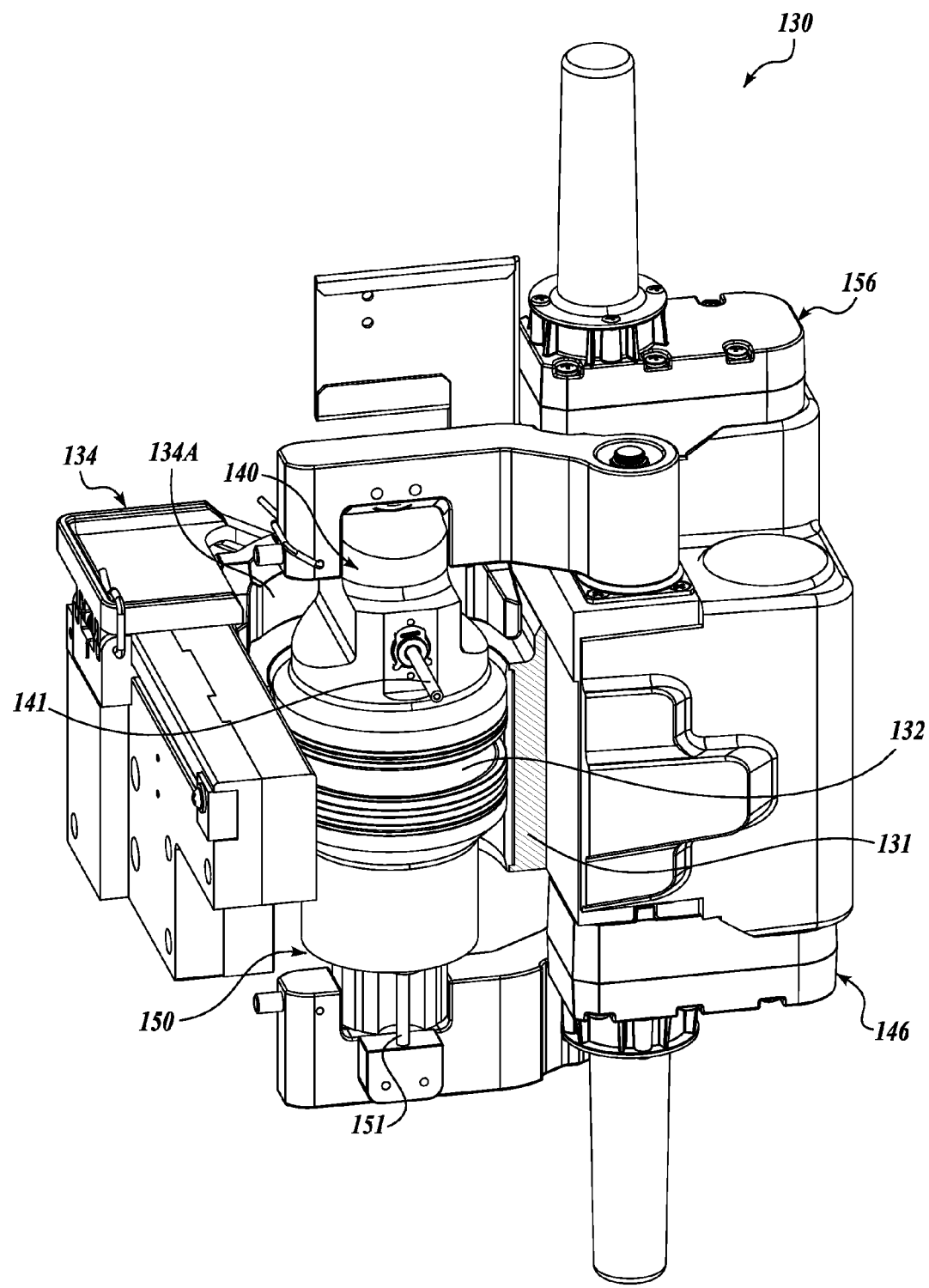

FIG. 7C shows the brew group 130 wherein the lower piston assembly 150 has been moved upwardly part way through brewing chamber 132. In the first mode of operation, one or more valves (not shown) redirect the flow to a drain that is preferably plumbed into the system 100. In the second mode of operation, the upward movement of the lower piston assembly 150 dispenses the brewed liquid. In either case, the now spent brewed material is compressed between the upper piston assembly 140 and the lower piston assembly 150, such that a significant portion of the water is removed.

Figure 7D:
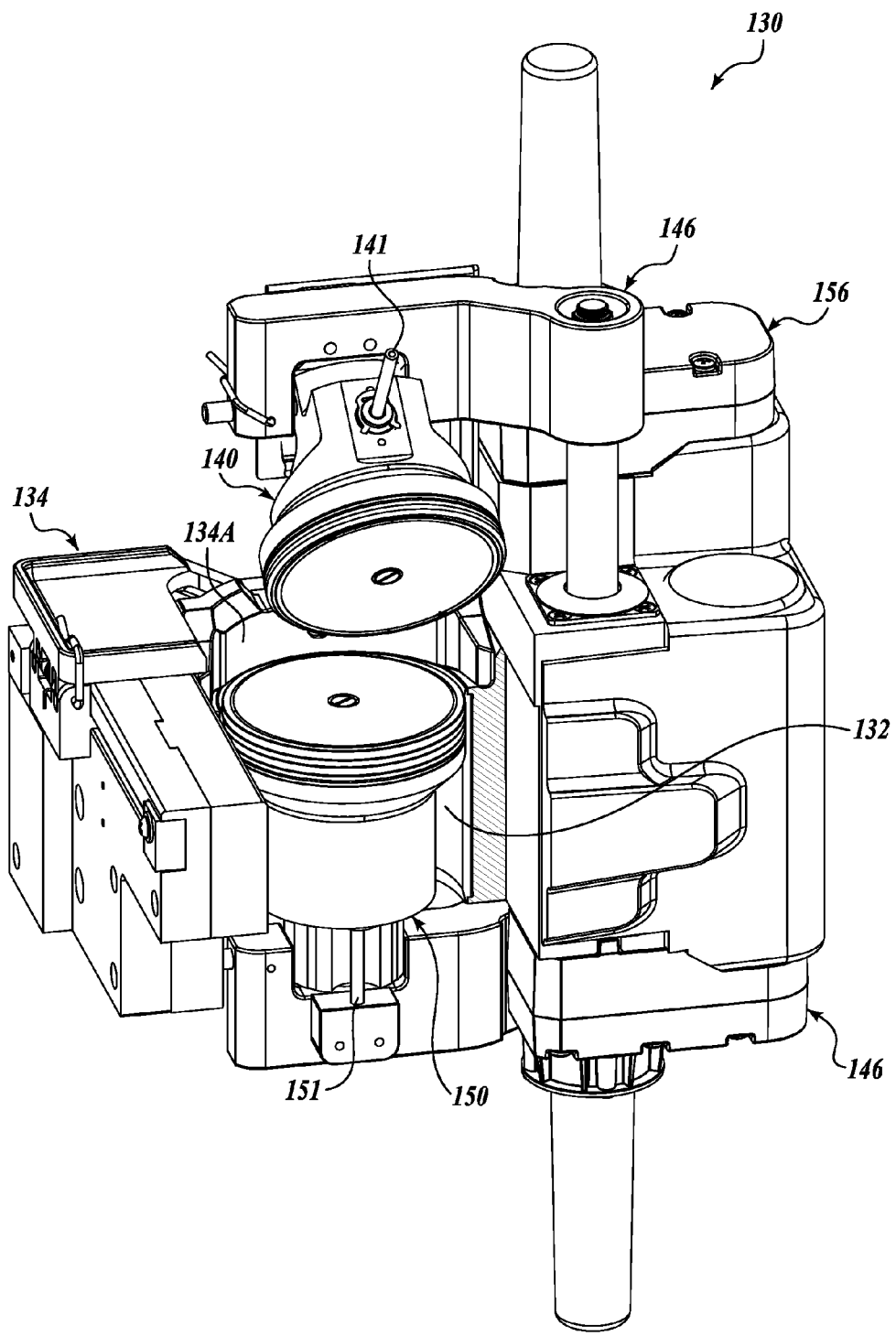

Referring now to FIG. 7D, the upper piston assembly 140 is moved upwardly to disengage from the brewing chamber 132 and pivots to the load position. The lower piston assembly 150 is moved upwardly such that the piston is approximately flush with the upper surface of the block assembly 131. The compressed spent grounds are therefore positioned to be removed, and the upper piston assembly 140 is moved out of the way of the sliding arm assembly 134.

Figure 7E:
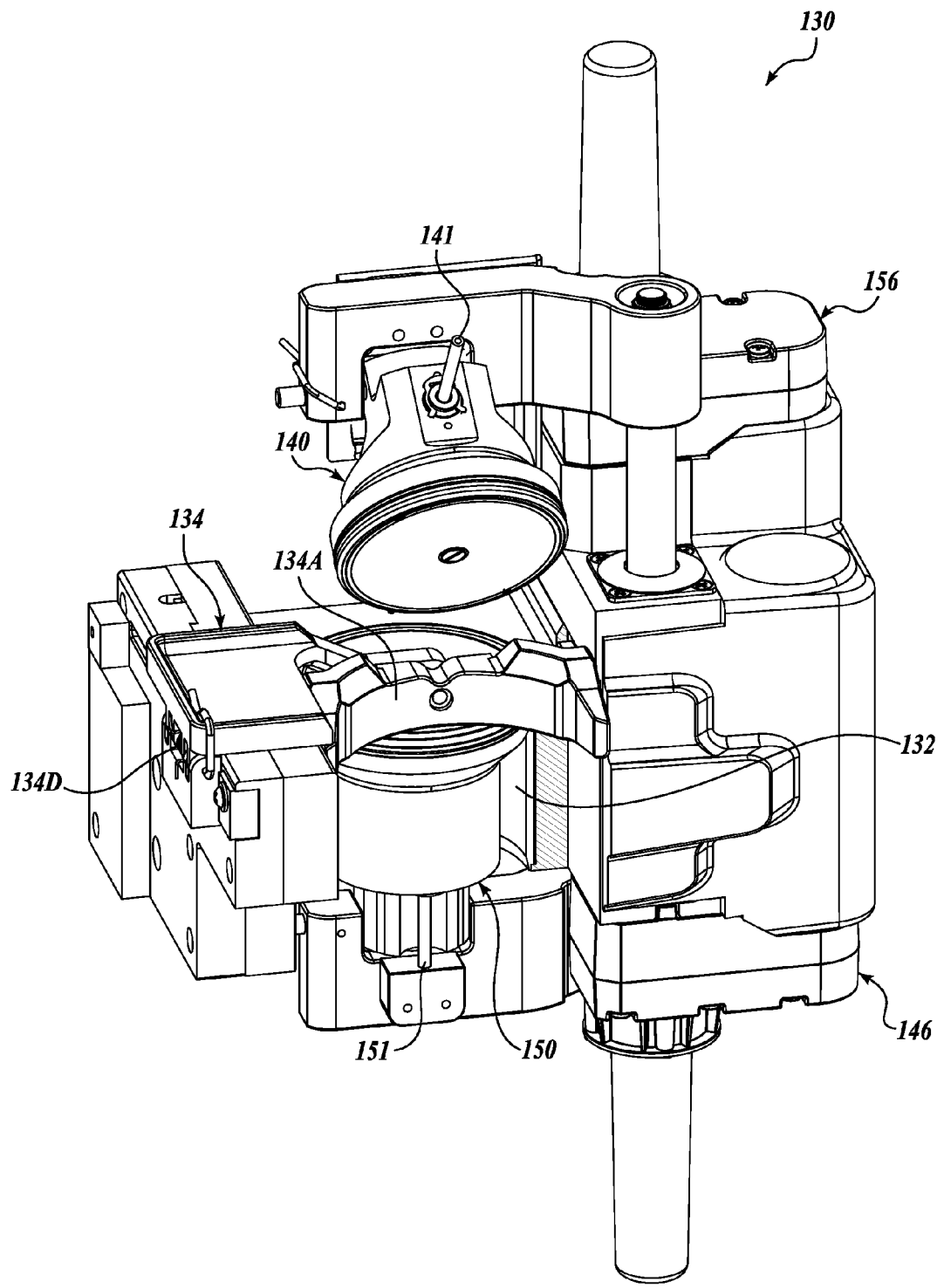

FIG. 7E shows the sliding arm assembly 134 after sliding the C-shaped arm 134A over the brewing chamber 132 to remove the spent grounds. The system 100 may include an internal repository or chute for the spent grounds, or may be positioned over an external repository positioned to receive the grounds. The sliding arm assembly 134 may then be retracted, to return to the ready position shown in FIG. 7A.

The benefit of the flexibility of the sliding arm assembly 134 will now be appreciated. The flexible sliding arm assembly 134 is able to overcome certain obstacles while still effectively removing the spent grounds. For example, if the lower piston assembly 150 extends to a position slightly higher than the upper surface of the block assembly 131, the spring-loaded hinge connection 134D permits the drive arm subassembly 134B to adjust as the lower beveled edge of the C-shaped arm 134A encounters the piston. Moreover, because the drive arm subassembly 134B pivotably engages the C-shaped arm 134A at or near the center of the arm, the arm 134A will maintain a relatively uniform engagement and downward force on the lower piston assembly 150, to effectively remove the spent grounds.

Figure 8A:
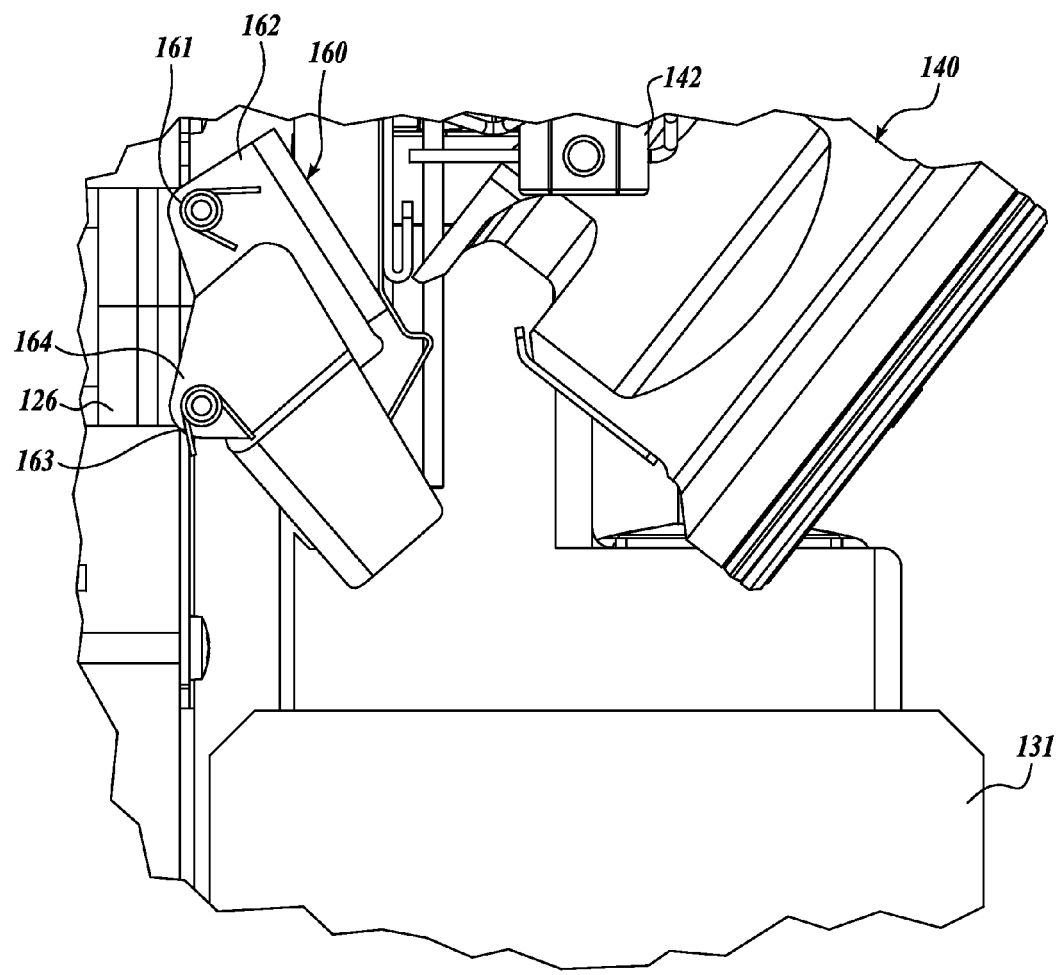
FIGS. 8A-8E illustrate the operation of the chute for the brewing system shown in FIG. 1.

FIGS. 8A-8E illustrate the motion of the chute assembly and the upper piston assembly 140 as the upper piston assembly 140 moves from the load position to the brewing position. FIG. 8A shows the upper piston assembly 140 in the load position with the upper support arm 142 at or near its uppermost position. A chute assembly 160 is pivotably attached to the chute base 126. In this embodiment, an upper chute member 162 is pivotably attached and biased outwardly (counterclockwise in FIGS. 8A-8E) with an upper pivot assembly 161. The upper chute member 162 has a generally inverted U-shaped cross-section with downwardly-extending sidewalls. A lower chute member 164 is pivotably attached and biased outwardly (counterclockwise in FIGS. 8A-8E) below the upper chute member 162 with a lower pivot assembly 163. The lower chute member has a generally U-shaped cross-section with upwardly-extending sidewalls that overlap the upper chute member 162. It will be appreciated that in the load position, the chute assembly 160 is configured to direct brewable material such as coffee grounds directly and cleanly into the brewing chamber 132, while preventing the grounds from being inadvertently spread to other locations in the system.

Figure 8B:
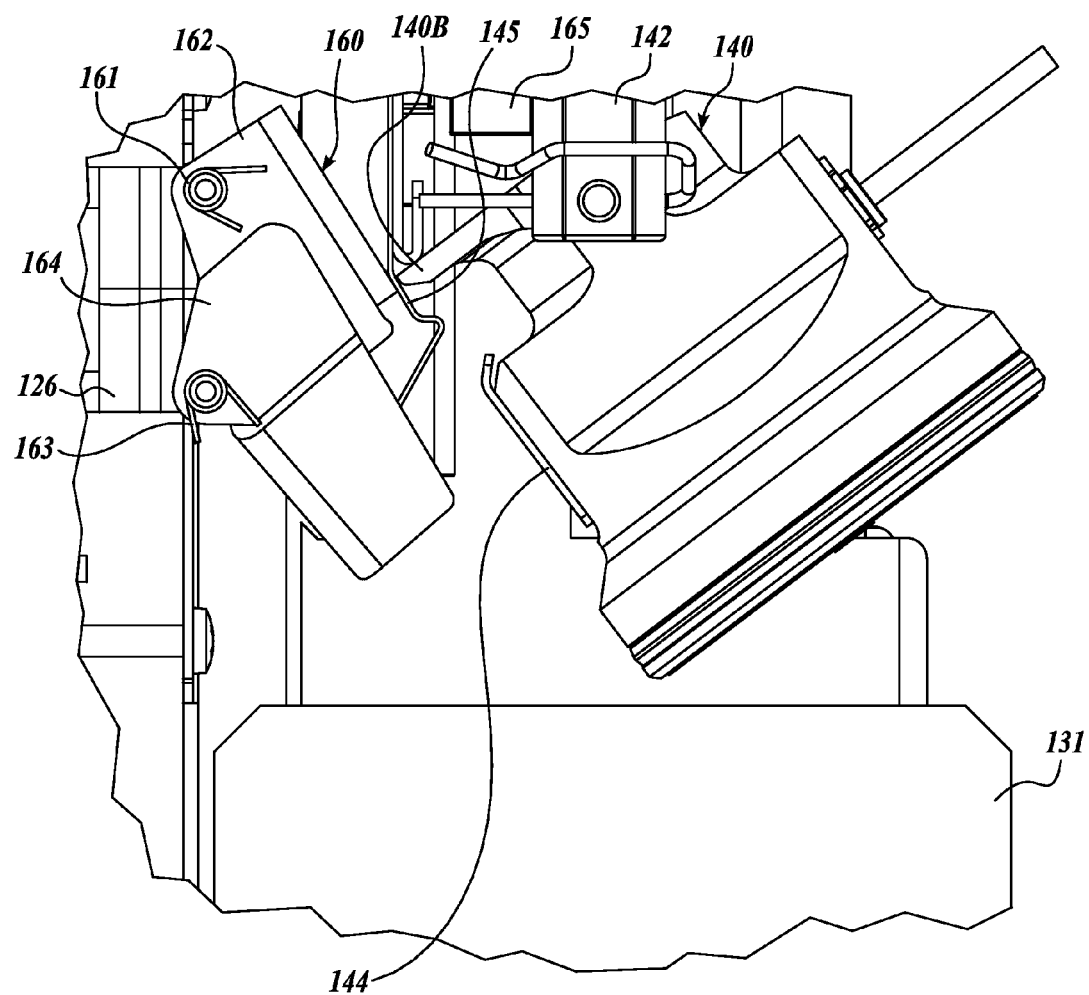

FIG. 8B shows the upper piston assembly 140 with the upper support arm 142 moved downwardly a short distance, as the fixed lever arm 140B of the upper piston assembly 140 engages the spring member 145 and begins to pivot toward an upright orientation.

Figure 8C:
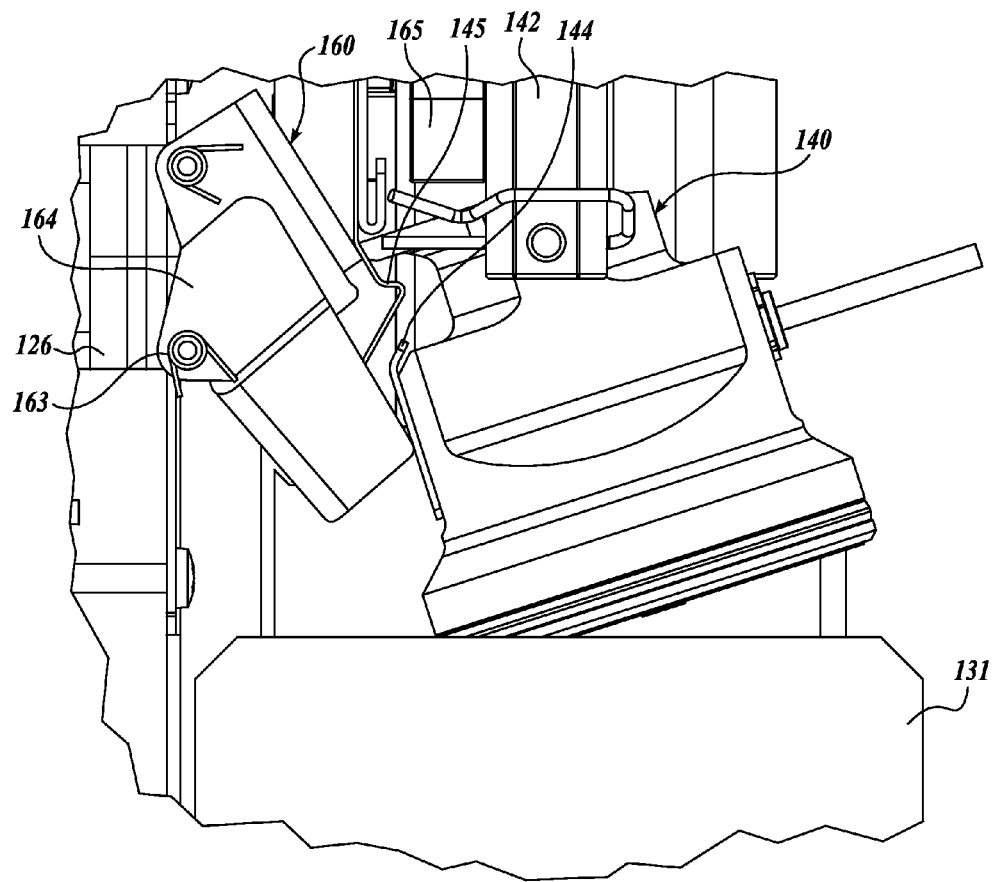

FIG. 8C shows the upper piston assembly 140 with the upper support arm 142 moved further toward the brewing position. The upper piston assembly 140 has pivoted further towards an upright orientation due to the engagement of the fixed lever arm 140B with the spring member 145. A strike plate 144 fixed to a face of the upper piston assembly 140 in this position now engages the lower chute member 164, and begins to pivot the lower chute member 164 out of the way, against the bias of the pivot assembly 163.

Figure 8D:
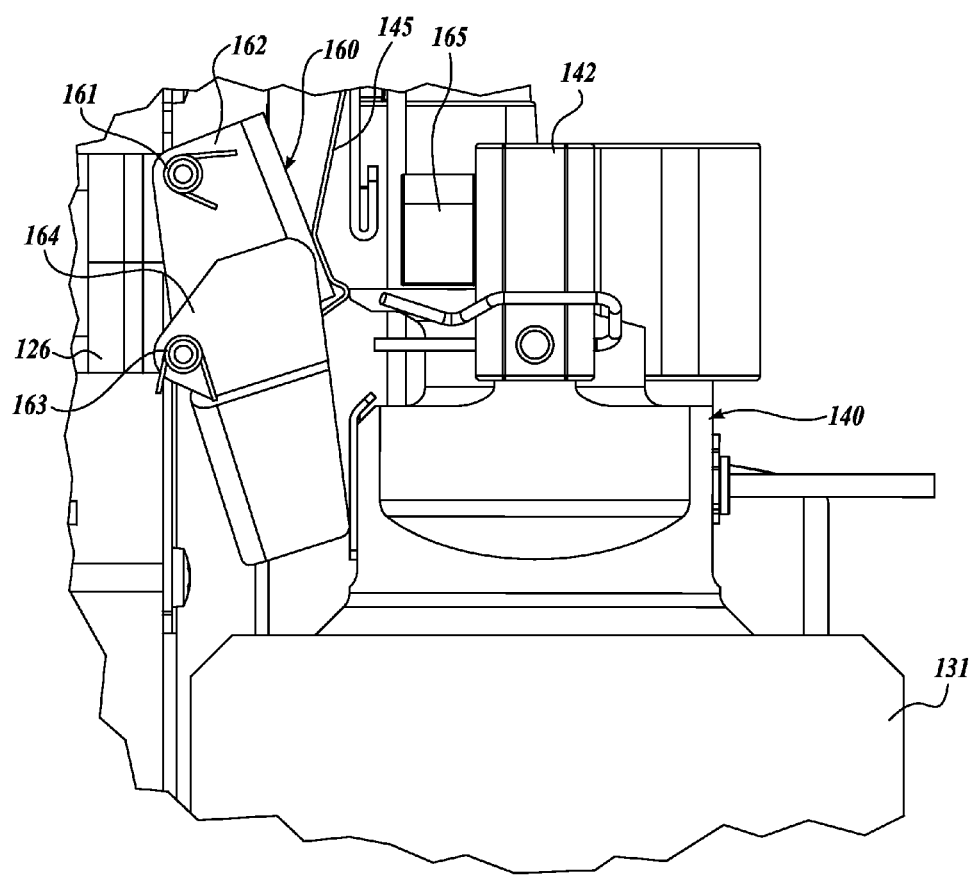

FIG. 8D shows the upper piston assembly 140 with the upper support arm 142 moved downwardly an additional distance. The upper piston assembly 140 has now pivoted to an upright position, and the fixed lever arm 140B engages a stop 165 on the upper support arm 142, which prevents the upper piston assembly 140 from pivoting further.

Figure 8E:
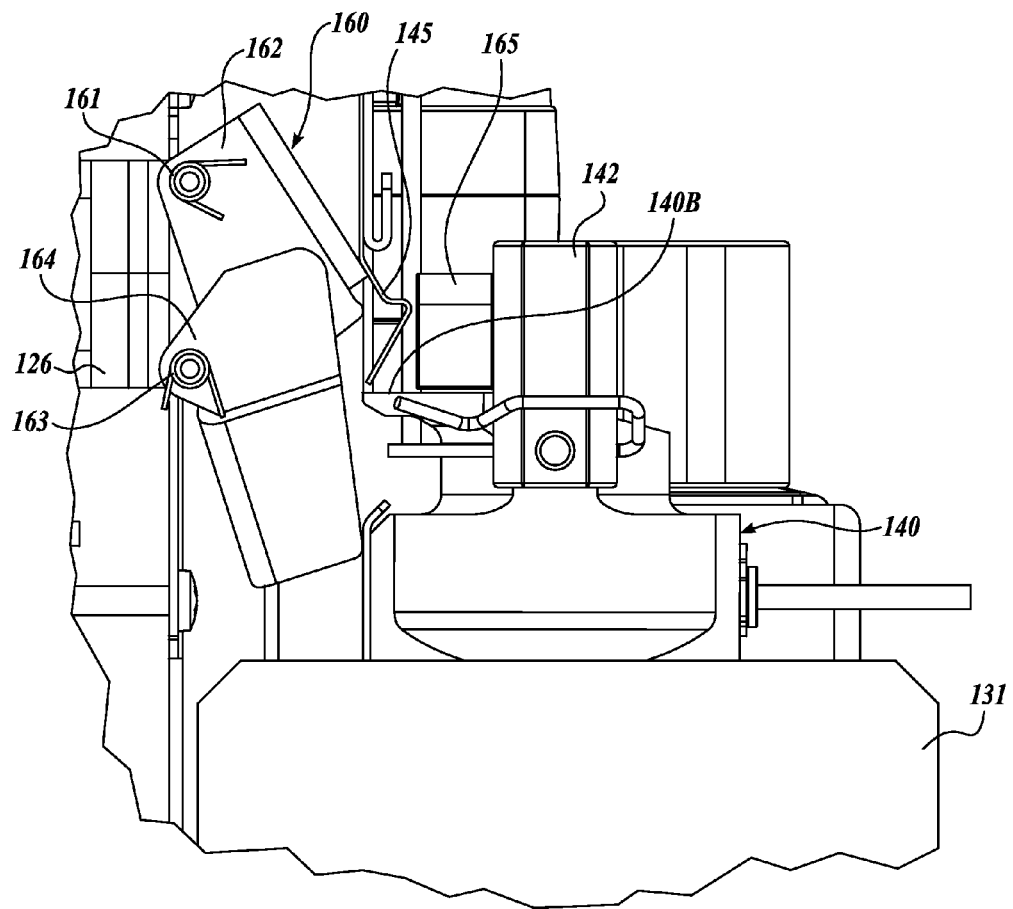

FIG. 8E shows the upper piston assembly 140 with the upper support arm 142 moved downwardly to the brewing position wherein the upper piston assembly 140 sealingly engages the brewing chamber 132, as discussed above. The spring member 145 is forced out of the way by the fixed lever arm 140B, against the bias of the spring member 145. It will be appreciated that the reverse kinematics will pivot the upper piston assembly 140 to the load position when the upper support arm 142 is moved upwardly.

Figure 9:
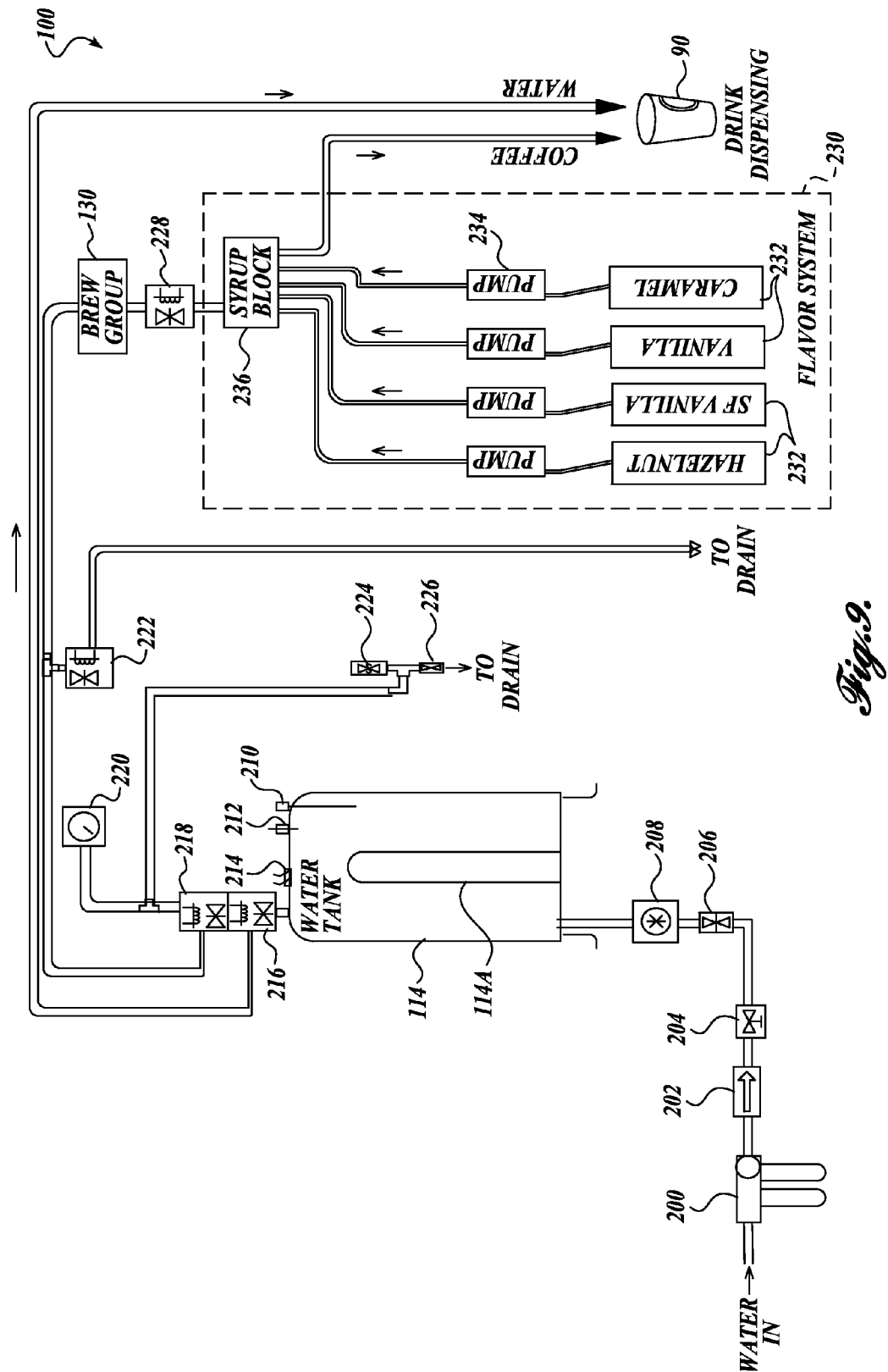
FIG. 9 is an exemplary brewer hydraulic diagram for a brewer assembly in accordance with the present invention.

FIG. 9 shows a hydraulic diagram for an embodiment of the brewing system 100, showing additional optional aspects of the system. The present invention will typically be implemented in an automated system that preferably provides for user selectable parameters. Therefore, the sensor information and various control elements such as the heater, valves, display elements, and the like will typically provide data to an onboard computer or control system and/or receive control signals from the control system. The computerized control system would typically include a processing unit, signal generating and receiving components, memory elements, and the like, as are well known in the art.

In this embodiment the water enters through a water filtration system 200, and may include a check valve 202 to prevent backflow, and a manual valve 204. A pressure regulator 206 and flow meter 208 are provided upstream of the water reservoir/heater 114, which includes an internal heating element 114A. The water reservoir/heater 114 is configured with suitable sensors and controls, for example a temperature probe 210, water level probe 212, and high limit switch 214. A hot water valve 216 may be provided to permit dispensing of hot water directly, without going through the brewer group 130. A brew valve 218 is operable to direct hot water to the brew group 130, and may further engage a water gauge 220, and pressure relief valve 224 with an expansion valve 226 to a drain.

An optional flavor system 130 includes a selection of flavorings 232 that may be controllably pumped 234 to a syrup block 236 to be mixed with the brewed coffee liquid prior to dispensing to the carafe 90 or other container. A bypass valve 236 may be engaged if no flavoring was selected. In the first mode of operation as discussed above, a significant quantity of brewed liquid is not dispensed, but rather is expelled from the brewing chamber 132 by the lower piston assembly 150 after dispensing the user beverage. This liquid may be directed to a drain through the drain valve 222.

For the above description, it will be appreciated that the currently preferred system provides for a liquid flow through the brewing chamber 132 that is initiated with heated water entering through the lower piston assembly 150 at the bottom of the brewing chamber 132, and brewed liquid exiting through the upper piston assembly 140. Although not preferred, it will be apparent to persons of skill in the art that with straightforward changes, the present invention may be practiced with the liquid flow proceeding in the opposite direction.

While illustrative embodiments have been illustrated and described, it will be appreciated that various changes can be made therein without departing from the spirit and scope of the invention.

The embodiments of the invention in which an exclusive property or privilege is claimed are defined as follows:

1. A brew group comprising:
   (a) a brewing chamber having an upper surface and a cylindrical aperture with an open first end and an open second end;
   (b) a lower piston assembly sized and configured to slidably engage the brewing chamber open first end;
   (c) a first actuator attached to the lower piston assembly and operable to move the lower piston assembly longitudinally through the cylindrical aperture;
   (d) an upper piston assembly sized and configured to sealingly engage the brewing chamber open second end;
   (e) a second actuator attached to the upper piston assembly and operable to move the upper piston assembly between (i) a load position wherein the upper piston assembly is disposed above the brewing chamber and is pivoted away from the brewing chamber, and (ii) a brewing position wherein the upper piston assembly sealingly engages the brewing chamber;
   (f) means for pivoting the upper piston assembly away from the brewing chamber when the second piston assembly is moved to the load position;
   (g) a sliding arm assembly having a scraping arm slidably disposed on the upper surface of the brewing chamber; and
   (h) a third actuator operable to move the scraping arm across the upper surface of the brewing chamber over the open second end of the brewing chamber wherein the scraping arm is hingedly attached to the third actuator.

2. The brew group of claim 1, wherein the lower piston assembly defines a flow channel therethrough fluidly connecting the brewing chamber with an external water supply tube.

3. The brew group of claim 2, wherein the lower piston assembly comprises a first piston member and a second piston member that is removably attached to the first piston member.

4. The brew group of claim 3, wherein the first piston member and the second piston member cooperatively define an annular peripheral groove, and further comprising a seal ring disposed in the annular peripheral groove, wherein the seal ring is configured to sealingly engage the brewing chamber.

5. The brew group of claim 1, wherein the upper piston assembly comprises a first piston member that is attached to the second actuator, a second piston member that is removably attached to the first piston member, the first and second piston members cooperatively defining an annular channel, and a ring seal disposed in the annular channel.

6. The brew group of claim 5, wherein the first piston member defines a flow channel therethrough, and the second piston member comprises a plurality of flow channels therethrough that fluidly engage the first piston member flow channel.

7. The brew group of claim 6, wherein the upper piston assembly further comprises a dispensing tube that sealingly engages the first piston member flow channel.

8. The brew group of claim 7, wherein the upper piston assembly further comprising a seal means disposed between the first piston member flow channel and the second piston member plurality of flow channels.

9. The brew group of claim 7, further comprising a perforated plate attached to a distal face of the second piston member.

10. The brew group of claim 9, wherein a distal face of the second piston member is configured with a plurality of spacing members such that a flow path is defined between the distal face of the second piston member and the perforated plate.

11. The brew group of claim 1, wherein the first actuator comprises a lead screw assembly.

12. The brew group of claim 1, wherein the means for pivoting the upper piston assembly comprises a lever arm on the upper piston assembly and a fixed spring member that engages the lever arm to pivot the upper piston assembly as the upper piston assembly is moved to the load position.

13. The brew group of claim 1, wherein the brew group is configured to retain a liquid pressure between 10 psig and 100 psig when the brew group is brewing a brewed liquid.

14. A method for producing a brewable beverage comprising the steps of:
  (a) providing a brew group having (i) a brewing chamber defining a cylindrical aperture having an open first end and an open second end; (ii) a lower piston assembly that slidably engages the open first end of the cylindrical aperture; (iii) an upper piston assembly movable between a load position wherein the upper piston assembly is disposed above the cylindrical aperture and pivoted away from the cylindrical aperture, and a brewing position wherein the upper piston assembly sealingly engages the open second end of the cylindrical aperture; and (iv) a sliding arm assembly configured with an actuator, the sliding arm assembly being configured to slide over the open second end of the cylindrical aperture, wherein the sliding bar assembly is hingedly attached to the actuator;
  (b) with the upper piston assembly in the load position, depositing a brewable material into the brewing chamber;
  (c) moving the upper piston assembly to the brewing position;
  (d) initiating a flow of heated water into the brewing chamber to produce a brewing pressure between 10 psig and 100 psig;
  (e) stopping the flow of heated water into the brewing chamber and allowing the brewable material to brew thereby producing a brewed liquid in the brewing chamber;
  (f) forcing a portion of the brewed liquid out of the brewing chamber;
  (g) moving the lower piston partially through the cylindrical aperture such that the brewable material is compressed between the upper piston assembly and the lower piston assembly;
  (h) moving the upper piston assembly to the load position;
  (i) moving the lower piston through the cylindrical aperture to a position substantially flush with the open second end of the cylindrical aperture; and
  (j) moving the sliding arm assembly over the open second end of the cylindrical aperture to remove the brewable material.

15. The method of claim 14, wherein the step of forcing the brewed liquid from the brewing chamber is accomplished by slidably moving the lower piston assembly through the brewing chamber.

16. The method of claim 14, wherein the step of forcing the brewed beverage from the brewing chamber is accomplished by reinitiating the flow of heated water into the brewing chamber.

17. The method of claim 14, wherein the upper piston assembly further comprises a channel therethrough that is fluidly connected to a dispensing tube, and wherein the brewed liquid is forced from the brewing chamber through the dispensing tube.

18. The method of claim 14, wherein the brewing pressure produced is between 20 psig and 60 psig.

19. A system for producing a brewed coffee beverage comprising:
  (a) a hopper configured to dispense coffee beans;
  (b) a grinder configured to receive coffee beans from the hopper and to dispense ground coffee;
  (c) a reservoir of heated water;
  (d) a brew group comprising (i) a brewing chamber having an upper surface and a cylindrical aperture with an open first end and an open second end; (ii) a lower piston assembly sized and configured to slidably engage the brewing chamber open first end; (iii) a first actuator attached to the lower piston assembly and operable to move the lower piston assembly longitudinally through the cylindrical aperture; (iv) an upper piston assembly sized and configured to sealingly engage the brewing chamber open second end; (v) a second actuator attached to the upper piston assembly and operable to move the upper piston assembly between a load position wherein the upper piston assembly is disposed above the brewing chamber and is pivoted away from the brewing chamber and a brewing position wherein the upper piston assembly sealingly engages the brewing chamber; (vi) means for pivoting the upper piston assembly away from the brewing chamber when the second piston assembly is moved to the load position; (vii) a sliding arm assembly having a scraping arm slidably disposed on the upper surface of the brewing chamber; and (viii) a third actuator operable to move the scraping arm across the upper surface of the brewing chamber over the open second end of the brewing chamber wherein the scraping arm is hingedly attached to the third actuator; and
  (e) a programmable controller operably connected to control operation of the hopper, the grinder, the reservoir, the first actuator, the second actuator, and the slidable means to selectively deposit ground coffee into the brewing chamber, close the brewing chamber, provide heated water at between 10 psig and 100 psig to the brewing chamber, and dispense a brewed liquid from the brewing chamber.

20. The system of claim 19, wherein the lower piston assembly comprises a first piston member and a second piston member that is configured to be removably attachable to the first piston member, wherein the first piston member and the second piston member cooperatively define an annular channel therebetween, and further comprising a seal ring that is retained in the annular channel.

21. The system of claim 19, wherein the lower piston assembly defines a flow channel therethrough fluidly connecting the brewing chamber with an external water supply tube.

22. The system of claim 19, wherein the lower piston assembly further comprises a water supply tube that sealingly engages a first flow channel extending through the lower piston assembly to the brewing chamber, and the upper piston assembly further comprises a dispensing tube that sealingly engages a second flow path extending through the upper piston assembly to the brewing chamber.

23. The system of claim 19, further comprising a pivotable chute assembly defining a receiving end that is configured to receive the dispensed ground coffee, and an output end that is disposed over the brewing chamber when the upper piston assembly is in the load position.

24. The system of claim 23, wherein the pivotably chute assembly is biased toward the brewing chamber, and further wherein the upper piston assembly moves the pivotably chute assembly away from the brewing chamber when the upper piston assembly moves from the load position to the brewing position.

* * * * *